US012592636B2

(12) United States Patent
Takobe

(10) Patent No.: US 12,592,636 B2
(45) Date of Patent: Mar. 31, 2026

(54) POWER SUPPLY SEMICONDUCTOR DEVICE, INCLUDING A DELAY CIRCUIT TO PROTECT POWER TRANSISTOR

(71) Applicant: ROHM Co., LTD., Kyoto (JP)

(72) Inventor: Isao Takobe, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 331 days.

(21) Appl. No.: 18/312,861

(22) Filed: May 5, 2023

(65) Prior Publication Data

US 2023/0361673 A1 Nov. 9, 2023

(30) Foreign Application Priority Data

May 9, 2022 (JP) ................................. 2022-077199

(51) Int. Cl.
*H02M 3/07* (2006.01)
*H02M 1/32* (2007.01)
*H02M 1/08* (2006.01)

(52) U.S. Cl.
CPC ............... *H02M 3/07* (2013.01); *H02M 1/32* (2013.01); *H02M 1/08* (2013.01)

(58) Field of Classification Search
CPC ............................................. H02M 3/07–078
See application file for complete search history.

(56) References Cited

U.S. PATENT DOCUMENTS

| | | | | |
|---|---|---|---|---|
| 11,996,766 | B2 * | 5/2024 | Fukushima | ............. H02M 1/32 |
| 2018/0062643 | A1 * | 3/2018 | Trescases | ......... H03K 17/04206 |
| 2020/0313550 | A1 * | 10/2020 | Chen | ........................ H02M 3/07 |
| 2022/0131462 | A1 * | 4/2022 | Deng | .................... H02M 3/158 |

FOREIGN PATENT DOCUMENTS

| | | |
|---|---|---|
| JP | 2012-054804 A | 3/2012 |
| JP | 2012-157118 A | 8/2012 |
| JP | 2015-115963 A | 6/2015 |
| WO | WO2021054027 | 3/2021 |

OTHER PUBLICATIONS

Office Action for corresponding Japanese application JP2022-077199 mailed Feb. 3, 2026.

* cited by examiner

*Primary Examiner* — Peter M Novak
(74) *Attorney, Agent, or Firm* — CHIP LAW GROUP

(57) ABSTRACT

Disclosed herein is a power supply semiconductor device used in a switched capacitor converter including a plurality of power transistors and a plurality of capacitors, the switched capacitor converter configured to turn on and off the plurality of power transistors according to a predetermined pattern to generate an output voltage from an input voltage. The power supply semiconductor device includes a control block configured to generate a control signal for designating ON or OFF of each of the power transistors, and a drive block connected to a gate of each of the power transistors and configured to drive the gate of each of the power transistors according to the control signal to turn on or off each of the power transistors.

9 Claims, 14 Drawing Sheets

F I G . 5
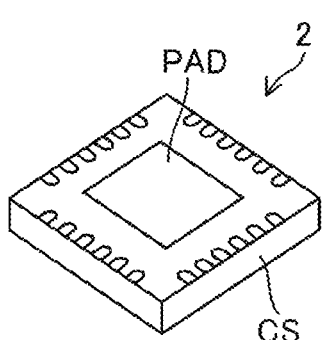
F I G . 6
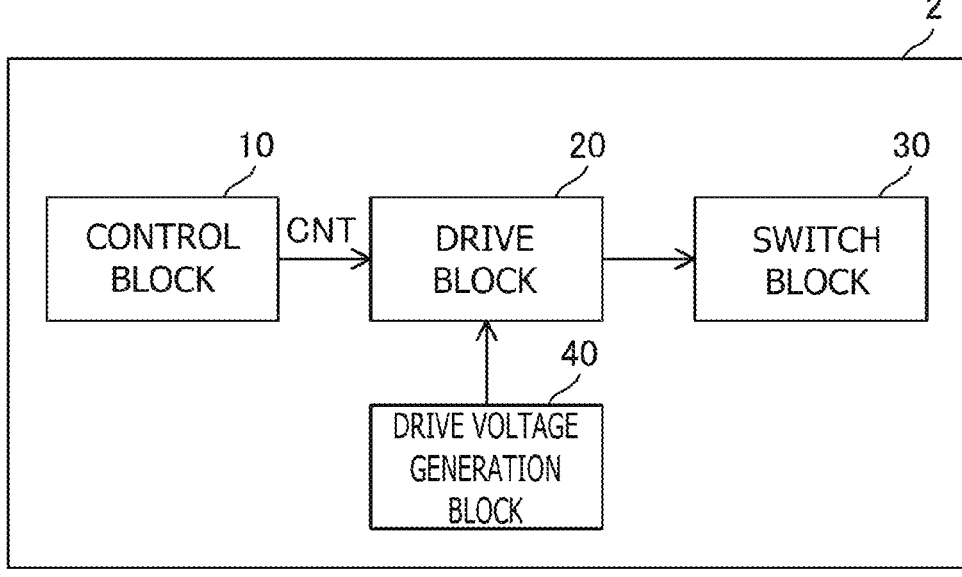

F I G . 7
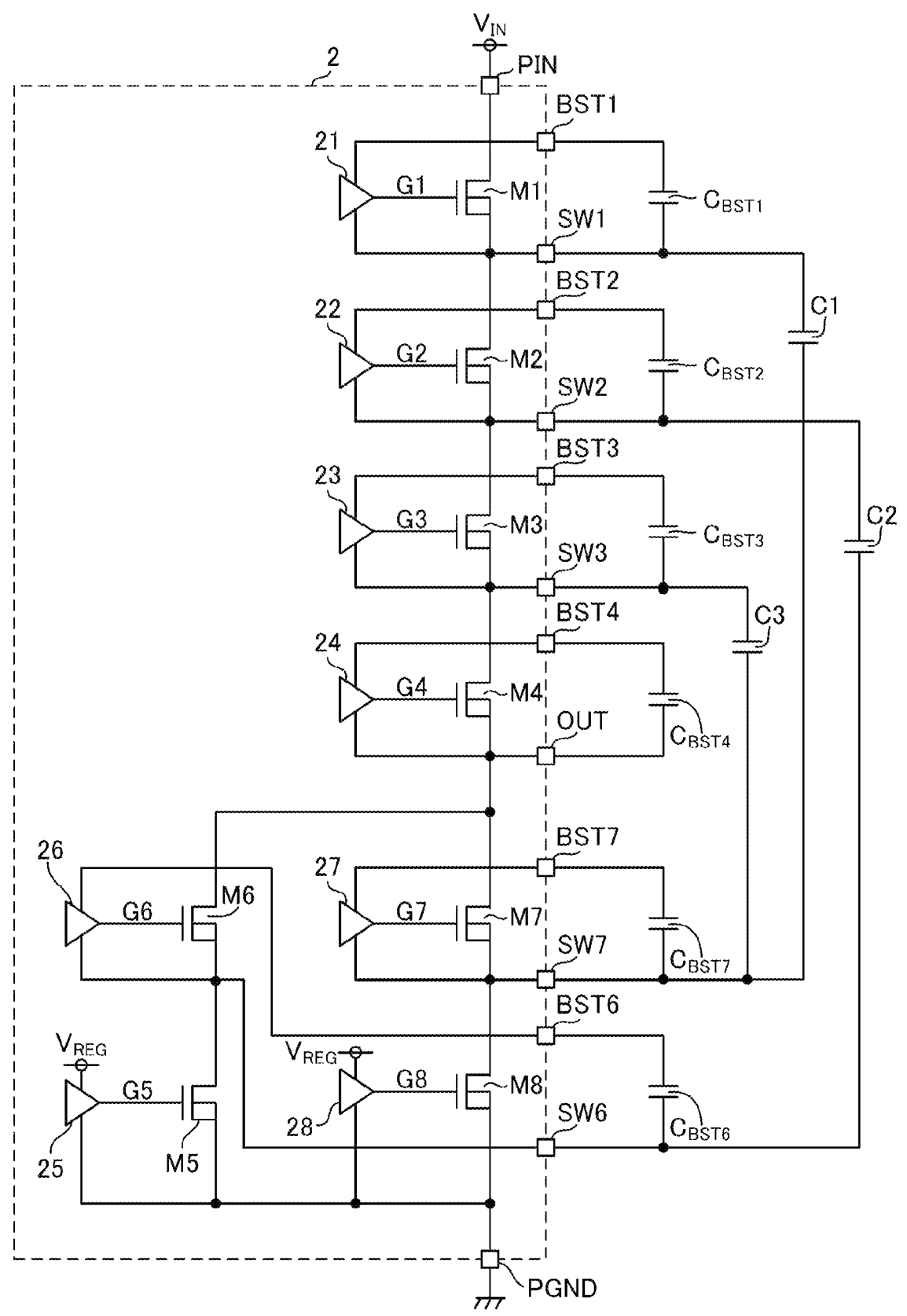

F I G . 9
SWITCHING CONTROL SC
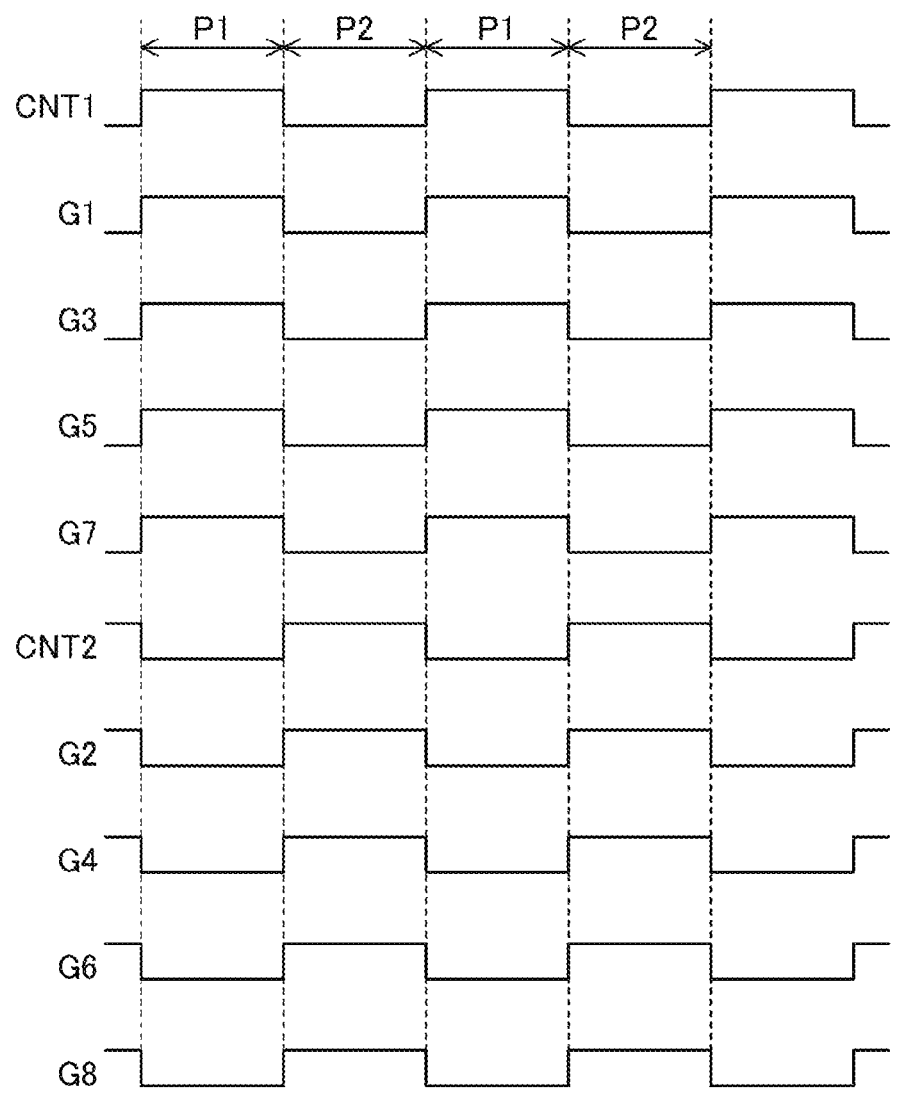

F I G . 1 2
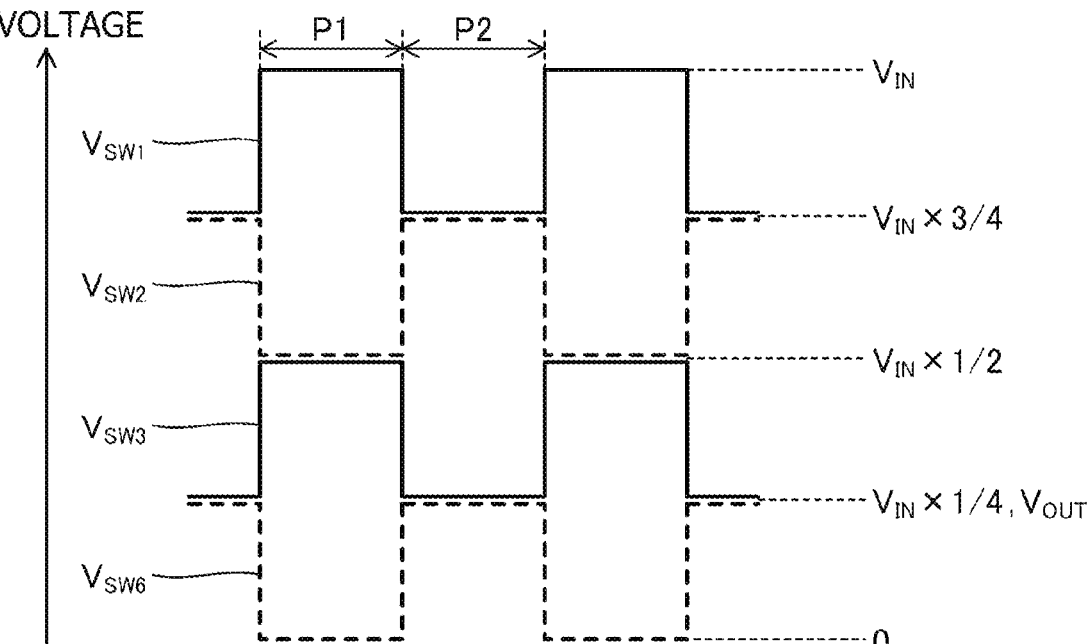
SWITCHING CONTROL SC

F I G . 1 3
SD4
BST1  SW1  SW2  SW3  OUT  SW7    CS
| 24 | 23 | 22 | 21 | 20 | 19 |
Y → (X down)
PIN — 1                                18 — PGND
IN — 2                                 17 — SW6
SD1
EN — 3                                 16 — BST6    SD3
VREG — 4                               15 — NC3
NC1 — 5                                14 — BST7
BST2 — 6                               13 — PG
| 7 | 8 | 9 | 10 | 11 | 12 |
BST3  NC2  RT  GND  EXTVCC  BST4
SD2
F I G . 1 4
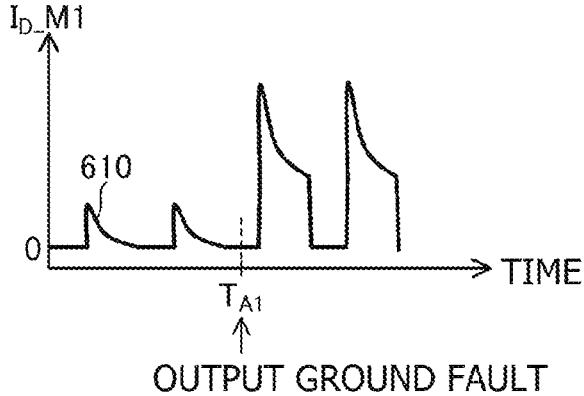
OUTPUT GROUND FAULT

NORMAL STATE $V_{IN}=48V$    $V\_C1=36V$    $V_{OUT}=12V$

OUTPUT GROUND FAULT STATE $V_{IN}=48V$    $V\_C1=36V$    $12V$    $V_{OUT}=0V$ $I_D\_M1$ $V_{GS}\_M1=5V$ $V_{DS}\_M1$ $I_D\_M1$    $t_{DLY1}$

610

$t_{DLY2}$

0

$T_{A1}$    TIME

POWER SUPPLY SEMICONDUCTOR DEVICE, INCLUDING A DELAY CIRCUIT TO PROTECT POWER TRANSISTOR

CROSS REFERENCE TO RELATED APPLICATIONS

This U.S. application claims priority benefit of Japanese Patent Application No. JP 2022-077199 filed in the Japan Patent Office on May 9, 2022. Each of the above-referenced applications is hereby incorporated herein by reference in its entirety.

BACKGROUND

The present disclosure relates to a power supply semiconductor device and a switched capacitor converter.

There is a switched capacitor converter as a type of power supply apparatus. The switched capacitor converter includes a plurality of power transistors and a plurality of capacitors, and the switched capacitor converter switches the plurality of power transistors to generate an output voltage from an input voltage. Note that some kind of protection is generally performed when an abnormality, such as a ground fault, is detected in a DC/DC converter with an inductor.

An example of the related art is disclosed in PCT Patent Publication No. WO2021/054027.

BRIEF DESCRIPTION OF THE DRAWINGS

FIG. 5 is an external perspective view of the power supply IC according to the embodiment of the present disclosure;

FIG. 6 is a schematic block diagram of the power supply IC according to the embodiment of the present disclosure;

FIG. 7 depicts a connection relation between the power supply IC and a plurality of capacitors according to the embodiment of the present disclosure;

FIG. 9 is a timing chart of switching control that can be executed by the power supply IC according to the embodiment of the present disclosure;

FIG. 12 depicts waveforms of terminal voltages in the switching control according to the embodiment of the present disclosure;

FIG. 13 depicts an external terminal array of the power supply IC according to the embodiment of the present disclosure;

FIG. 14 is a waveform diagram of a drain current of a specific power transistor (assuming that a protection operation is not performed);

DETAILED DESCRIPTION

Figure 1:
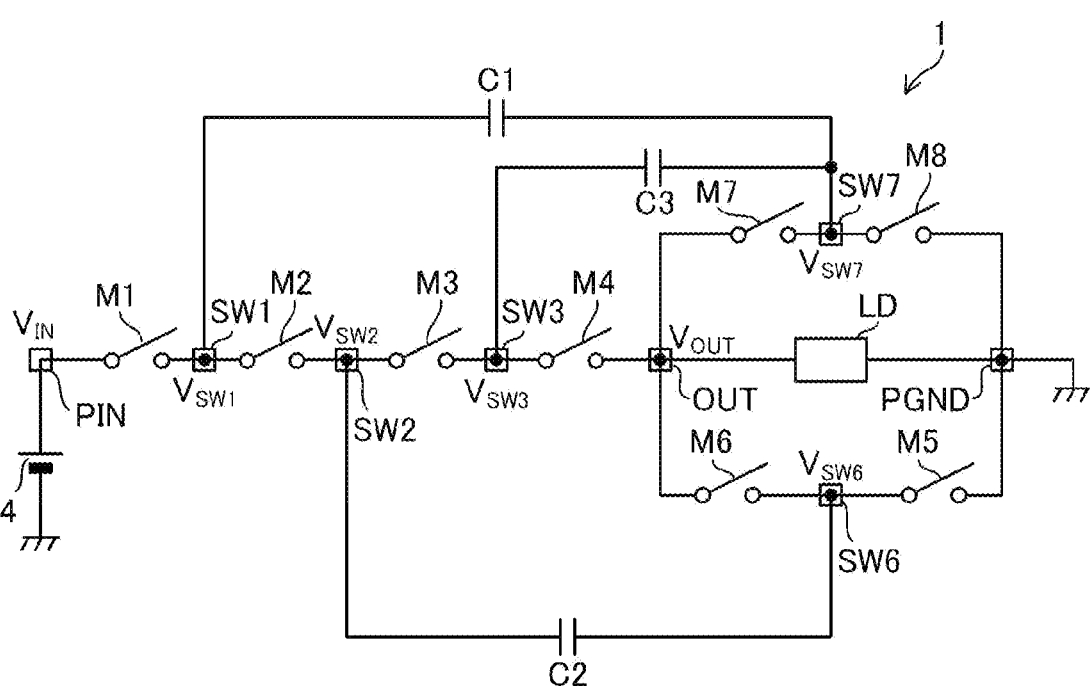
FIG. 1 is a circuit diagram of a power supply apparatus (switched capacitor converter) according to an embodiment of the present disclosure.

An example of an embodiment of the present disclosure will now be specifically described with reference to the drawings. The same reference signs are provided to the same parts in the referenced drawings, and the description related to the same parts will not be basically repeated. In the present specification, symbols or reference signs for referencing information, signals, physical quantities, functional units, circuits, elements, or parts may be provided in order to omit or abbreviate the names of the information, the signals, the physical quantities, the functional units, the circuits, the elements, or the parts corresponding to the symbols or the signs, for the simplification of the description.

First, some terms used in the description of the embodiment of the present disclosure will be explained. An IC is an abbreviation for an integrated circuit. A ground denotes a reference conductive portion with a potential of 0 V (zero volt) as a reference or denotes the potential of 0 V. A conductor such as metal may be used to form the reference conductive portion. The potential of 0 V will be referred to as a ground potential in some cases. In the embodiment of the present disclosure, a voltage indicated without particularly providing a reference represents a potential with respect to the ground.

A level denotes a level of the potential, and the potential of a high level regarding a freely selected target signal or voltage is higher than the potential of a low level. A freely selected target signal or voltage in a high level technically means that the level of the signal or the voltage is in the high level, and a signal or a voltage in a low level technically means that the level of the signal or the voltage is in the low level. The level regarding the signal will be expressed as a signal level in some cases, and the level regarding the voltage will be expressed as a voltage level in some cases.

A switch from the low level to the high level in a freely selected target signal or voltage will be referred to as an up edge, and the timing of the switch from the low level to the high level will be referred to as up edge timing. The term "up edge" may be replaced with a term "rising edge." Similarly, a switch from the high level to the low level in a freely selected target signal or voltage will be referred to as a down edge, and the timing of the switch from the high level to the low level will be referred to as down edge timing. The term "down edge" may be replaced with a term "falling edge."

An on-state of a freely selected transistor provided as a FET (field-effect transistor) including a MOSFET denotes a state in which the drain and the source of the transistor are electrically connected, and an off-state denotes a state (cut-off state) in which the drain and the source of the transistor are not electrically connected. Similar is true for a transistor not classified as a FET. It is understood that the MOSFET is an enhancement MOSFET unless otherwise stated. The MOSFET is an abbreviation for a "metal-oxide-semiconductor field-effect transistor." It can be considered that the back gate is short-circuited to the source in a freely selected MOSFET unless otherwise stated.

An example of electrical characteristics of the MOSFET includes a gate threshold voltage. In a freely selected transistor that is an N-channel enhancement MOSFET, the transistor is in the on-state when the gate potential of the transistor is higher than the source potential of the transistor and the magnitude of the gate-source voltage of the transistor is equal to or greater than the gate threshold voltage of the transistor. The transistor is in the off-state otherwise. In a freely selected transistor that is a P-channel enhancement MOSFET, the transistor is in the on-state when the gate potential of the transistor is lower than the source potential of the transistor and the magnitude of the gate-source voltage of the transistor is equal to or greater than the gate threshold voltage of the transistor. The transistor is in the off-state otherwise. The gate threshold voltage of a freely selected FET is defined as a gate-source voltage necessary for applying a drain current of predetermined magnitude when a predetermined voltage is applied between the drain and the source of the FET under a predetermined ambient temperature environment. The gate-source voltage corresponds to the gate potential with respect to the source potential.

The on-state and the off-state of a freely selected transistor will simply be expressed as "ON" and "OFF" in some cases. A switch from the off-state to the on-state of a freely selected transistor will be expressed as "turn on," and a switch from the on-state to the off-state will be expressed as "turn off."

For a freely selected signal with the signal level in the high level or the low level, a period in which the level of the signal is the high level will be referred to as a high level period, and a period in which the level of the signal is the low level will be referred to as a low level period. Similar is true for a freely selected voltage with the voltage level in the high level or the low level.

It can be understood that the connection between a plurality of sections forming a circuit, such as freely selected circuit elements, wires (lines), and nodes, is electrical connection unless otherwise stated.

FIG. 1 illustrates a circuit diagram of a power supply apparatus 1 according to the embodiment of the present disclosure. The power supply apparatus 1 is a switched capacitor converter (hereinafter, referred to as SCC). Therefore, the power supply apparatus 1 will be referred to as SCC 1.

Main constituent parts of the SCC 1 include switch elements M1 to M8 and capacitors C1 to C3 that are flying capacitors. A voltage source 4 is connected to the SCC 1. The voltage source 4 generates a direct-current (DC) voltage with a predetermined positive DC voltage value and supplies the DC voltage as an input voltage $V_{IN}$ to the SCC 1. A load LD of the SCC 1 is also illustrated in FIG. 1. The load LD is a freely selected load connected to the SCC 1.

Figure 2:
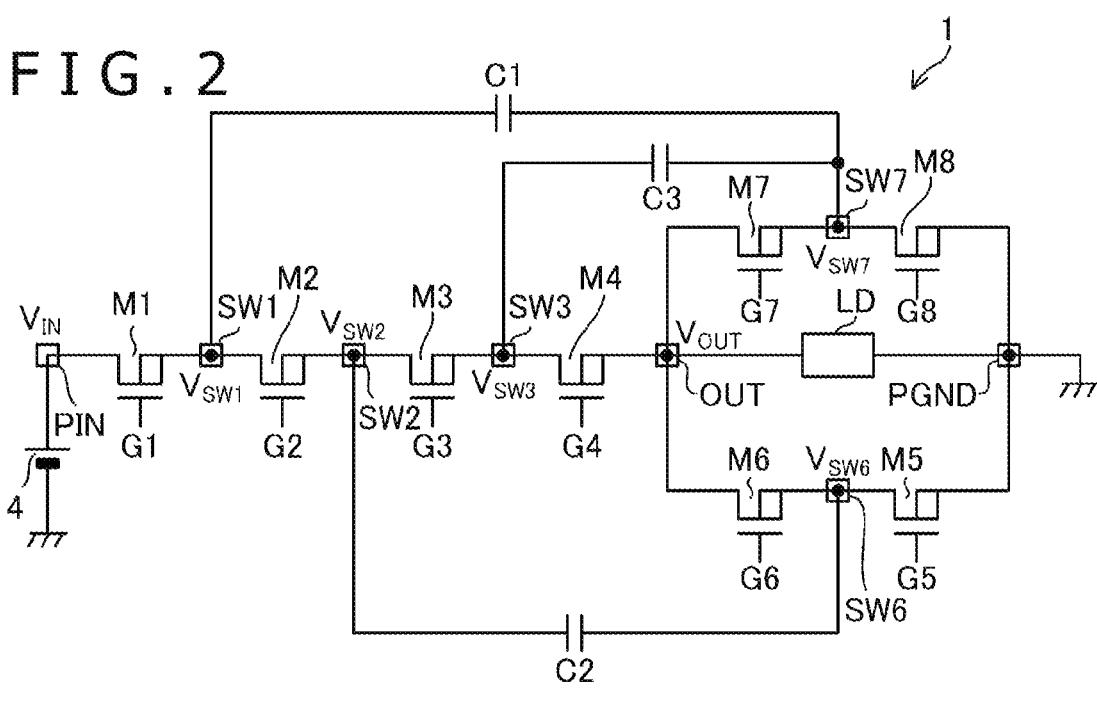
FIG. 2 is a circuit diagram of the power supply apparatus (switched capacitor converter) according to the embodiment of the present disclosure.

As illustrated in FIG. 2, the switch elements M1 to M8 include power transistors. Therefore, the parts M1 to M8 may be referred to as switch elements M1 to M8 or may be referred to as power transistors M1 to M8. Each of the power transistors M1 to M8 includes an N-channel MOSFET. One end of the switch element M1 corresponds to the drain of the power transistor M1, and the other end of the switch element M1 corresponds to the source of the power transistor M1. Similarly, one end of the switch element M2 corresponds to the drain of the power transistor M2, and the other end of the switch element M2 corresponds to the source of the power transistor M2. Similar is true for the switch elements M3 to M8.

A terminal PIN is an input terminal (voltage input terminal), and the terminal PIN receives the input voltage $V_{IN}$. A terminal OUT is an output terminal (voltage output terminal), and an output voltage $V_{OUT}$ is applied to the terminal OUT. The output voltage $V_{OUT}$ is an output voltage of the SCC 1. Voltages applied to terminals SW1, SW2, SW3, SW6, and SW7 will be referred to as voltages $V_{SW1}$, $V_{SW2}$, $V_{SW3}$, $V_{SW6}$, and $V_{SW7}$, respectively. A switching circuit including the power transistors M1 to M8 and the capacitors C1 to C3 is connected to the terminals PIN and OUT, and the power transistors M1 to M8 and the capacitors C1 to C3 are connected to each other such that the output voltage $V_{OUT}$ is generated from the input voltage $V_{IN}$ when the power transistors M1 to M8 are turned on and off according to a predetermined pattern.

Specifically, the drain of the power transistor M1 is connected to the terminal PIN. The terminal PIN is connected to the positive-side output terminal of the voltage source 4, and the terminal PIN receives the input voltage $V_{IN}$ from the voltage source 4. Therefore, the input voltage $V_{IN}$ is applied to the drain of the power transistor M1. The source of the power transistor M1, the drain of the power transistor M2, and a first end of the capacitor C1 are commonly connected to the terminal SW1. A second end of the capacitor C1, the source of the power transistor M7, and the drain of the power transistor M8 are commonly connected to the terminal SW7. The source of the power transistor M2, the drain of the power transistor M3, and a first end of the capacitor C2 are commonly connected to the terminal SW2. A second end of the capacitor C2, the source of the power transistor M6, and the drain of the power transistor M5 are commonly connected to the terminal SW6. The source of the power transistor M3, the drain of the power transistor M4, and a first end of the capacitor C3 are commonly connected to the terminal SW3. A second end of the capacitor C3 is connected to the terminal SW7. The source of the power transistor M4 and the drains of the power transistors M6 and M7 are commonly connected to the terminal OUT. The sources of the power transistors M5 and M8 are commonly connected to a terminal PGND. The terminal PGND is connected to the ground. One end of the load LD is connected to the terminal OUT, and the other end of the load LD is connected to the terminal PGND.

Therefore, the power transistor M1 is turned on or off to electrically connect or cut off the terminals PIN and SW1. The power transistor M2 is turned on or off to electrically connect or cut off the terminals SW1 and SW2. The power transistor M3 is turned on or off to electrically connect or cut off the terminals SW2 and SW3. The power transistor M4 is turned on or off to electrically connect or cut off the terminals SW3 and OUT. The power transistor M5 is turned on or off to electrically connect or cut off the terminals SW6 and PGND. The power transistor M6 is turned on or off to electrically connect or cut off the terminals OUT and SW6. The power transistor M7 is turned on or off to electrically connect or cut off the terminals OUT and SW7. The power transistor M8 is turned on or off to electrically connect or cut off the terminals SW7 and PGND.

It is assumed here that the SCC 1 functions as a voltage divider. Specifically, the output voltage $V_{OUT}$ is a voltage ¼ times the input voltage $V_{IN}$ in the SCC 1 of FIGS. 1 and 2. The value of the input voltage $V_{IN}$ may be freely selected. To specifically describe the voltage, it is assumed here that the input voltage $V_{IN}$ is 48 V. Therefore, the output voltage $V_{OUT}$ is 12 V when the operation of the SCC 1 is stable. Signals applied to the gates of the power transistors M1 to M8 will be referred to as gate signals, and the gate signals of the power transistors M1 to M8 will be referred to as gate signals G1 to G8, respectively.

Figure 3:
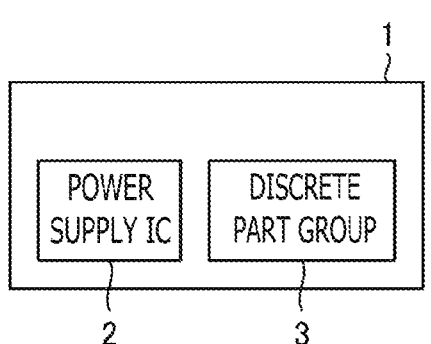
FIG. 3 is a schematic block diagram of the power supply apparatus according to the embodiment of the present disclosure.

FIG. 3 is a schematic configuration block diagram of the SCC 1. The SCC 1 includes: a power supply IC 2 that is a power supply semiconductor device; and a discrete part group 3 including a plurality of discrete parts externally connected to the power supply IC 2. The capacitors C1 to C3 are included in the discrete part group 3. The power supply IC 2 turns on and off the power transistors M1 to M8 according to a predetermined pattern to generate the output voltage $V_{OUT}$ from the input voltage $V_{IN}$. The power transistors M1 and M8 are built in the power supply IC 2. Here, the SCC 1 may be modified such that the power transistors M1 to M8 are included in the discrete part group 3.

Figure 4:
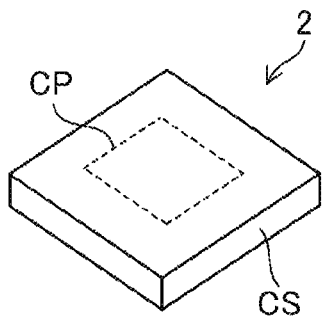
FIG. 4 is an external perspective view of a power supply integrated circuit (IC) according to the embodiment of the present disclosure.

FIGS. 4 and 5 illustrate external perspective views of the power supply IC 2. The power supply IC 2 is an electronic part including a semiconductor chip CP including a semiconductor integrated circuit formed on a semiconductor substrate, a casing CS (package) that houses the semiconductor chip CP, and a plurality of external terminals exposed from the casing CS to the outside the power supply IC 2. The power supply IC 2 is formed by enclosing the semiconductor chip CP in the casing CS including a resin. FIG. 4 is an external perspective view of the power supply IC 2 when the power supply IC 2 is observed from the front side of the casing CS of the power supply IC 2. FIG. 5 is an external perspective view of the power supply IC 2 when the power supply IC 2 is observed from the back side of the casing CS of the power supply IC 2. Only FIG. 4 of FIGS. 4 and 5 illustrates a dashed line to depict the schematic shape of the semiconductor chip CP. A metal pad PAD for releasing heat is provided on the back surface of the casing CS. The terminals PIN, OUT, PGND, SW1, SW2, SW3, SW6, and SW7 illustrated in FIGS. 1 and 2 are external terminals provided on the power supply IC 2.

Note that the type of the casing of the power supply IC 2 and the shapes and the number of external terminals of the power supply IC 2 illustrated in FIGS. 4 and 5 are illustrative only, and they can be optionally designed.

FIG. 6 illustrates a schematic internal block diagram of the power supply IC 2. The power supply IC 2 includes a control block 10, a drive block 20, a switch block 30, and a drive voltage generation block 40. The switch block 30 includes the power transistors M1 to M8. The control block 10, the drive block 20, the switch block 30, and the drive voltage generation block 40 are provided on the semiconductor chip CP in a form of a semiconductor integrated circuit.

The control block 10 generates control signals CNT for designating ON and OFF of the power transistors M1 to M8 and outputs the generated control signals CNT to the drive block 20. The drive block 20 is connected to the gates of the power transistors M1 to M8, and the drive block 20 drives the gates of the power transistors M1 to M8 according to the control signals CNT to turn on or off the power transistors M1 to M8. That is, the drive block 20 generates and outputs the gate signals G1 to G8 according to the control signals CNT to thereby individually put the states of the power transistors M1 to M8 into the on-state or the off-state as designated by the control signals CNT. The drive voltage generation block 40 generates drive voltages that are voltages for driving the power transistors M1 to M8. The drive block 20 uses the drive voltages to individually put the states of the power transistors M1 to M8 into the on-state or the off-state.

Gate drivers 21 to 28 illustrated in FIG. 7 are provided on the drive block 20. Terminals BST1 to BST4, BST6, and BST7 illustrated in FIG. 7 are external terminals provided on the power supply IC 2. In FIG. 7, capacitors $C_{BST1}$ to $C_{BST4}$, $C_{BST6}$, and $C_{BST7}$ are bootstrap capacitors included in the discrete part group 3.

First ends of the capacitors $C_{BST1}$ to $C_{BST4}$, $C_{BST6}$, and $C_{BST7}$ are connected to the terminals BST1 to BST4, BST6, and BST7, respectively, outside the power supply IC 2. Second ends of the capacitors $C_{BST1}$ to $C_{BST3}$, $C_{BST6}$, and $C_{BST7}$ are connected to the terminals SW1 to SW3, SW6, and SW7, respectively, outside the power supply IC 2, and a second end of the capacitor $C_{BST4}$ is connected to the terminal OUT. The capacitors C1 to C3 that are flying capacitors are also provided outside the power supply IC 2, and the capacitor C1 is connected to the terminals SW1 and SW7 outside the power supply IC 2. The capacitor C2 is connected to the terminals SW2 and SW6, and the capacitor C3 is connected to the terminals SW3 and SW7.

The gate driver 21 is connected to the terminals BST1 and SW1 and the gate of the power transistor M1, and the gate driver 21 generates and outputs the gate G1 according to the voltage between the terminals BST1 and SW1. The gate driver 22 is connected to the terminals BST2 and SW2 and the gate of the power transistor M2, and the gate driver 22 generates and outputs the gate G2 according to the voltage between the terminals BST2 and SW2. The gate driver 23 is connected to the terminals BST3 and SW3 and the gate of the power transistor M3, and the gate driver 23 generates and outputs the gate G3 according to the voltage between the terminals BST3 and SW3. The gate driver 26 is connected to the terminals BST6 and SW6 and the gate of the power transistor M6, and the gate driver 26 generates and outputs the gate G6 according to the voltage between the terminals BST6 and SW6. The gate driver 27 is connected to the terminals BST7 and SW7 and the gate of the power transistor M7, and the gate driver 27 generates and outputs the gate G7 according to the voltage between the terminals BST7 and SW7.

The gate driver 24 is connected to the terminals BST4 and OUT and the gate of the power transistor M4, and the gate driver 24 generates and outputs the gate G4 according to the voltage between the terminals BST4 and OUT. The gate driver 25 is connected to a terminal that receives an internal power supply voltage $V_{REG}$, the terminal PGND, and the gate of the power transistor M5, and the gate driver 25 generates and outputs the gate G5 according to the internal power supply voltage $V_{REG}$ with respect to the ground potential. The gate driver 28 is connected to a terminal that receives the internal power supply voltage $V_{REG}$, the terminal PGND, and the gate of the power transistor M8, and the gate driver 28 generates and outputs the gate G8 according to the internal power supply voltage $V_{REG}$ with respect to the ground potential.

Figure 8:
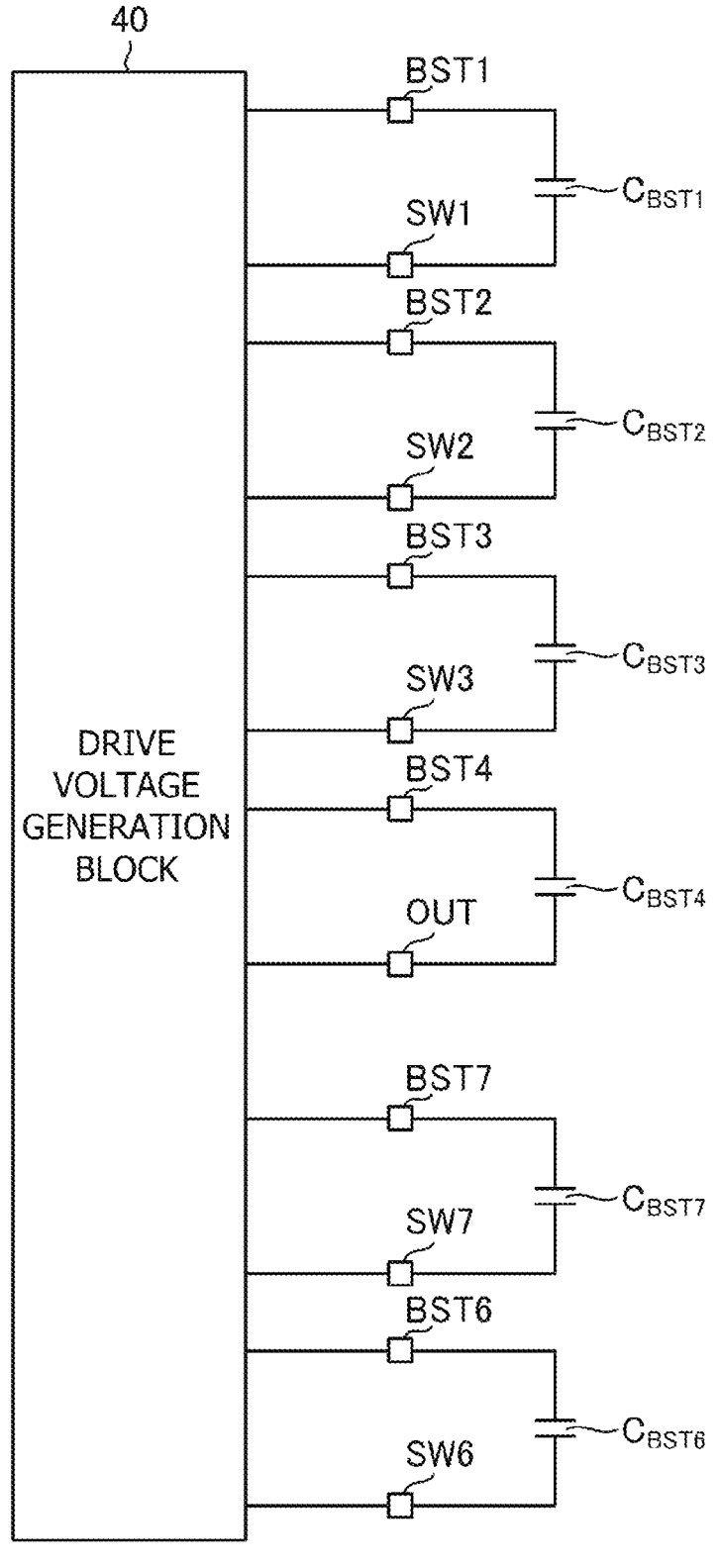
FIG. 8 depicts a relation between a drive voltage generation block and the plurality of capacitors according to the embodiment of the present disclosure.

As illustrated in FIG. 8, the drive voltage generation block 40 is connected to the terminals BST1 to BST4, BST6, BST7, SW1 to SW3, SW6, SW7, and OUT. The drive voltage generation block 40 forms a bootstrap circuit along with the capacitors $C_{BST1}$ to $C_{BST4}$, $C_{BST6}$, and $C_{BST7}$ to thereby generate the drive voltages (voltages for driving the power transistors M1 to M8) described above. The bootstrap circuit belongs to a well-known technique, and the detailed circuit configuration and operation inside the bootstrap circuit will not be described.

The drive voltages include a first boot voltage that is a voltage of the terminal BST1 with respect to the potential of the terminal SW1, a second boot voltage that is a voltage of the terminal BST2 with respect to the potential of the terminal SW2, a third boot voltage that is a voltage of the terminal BST3 with respect to the potential of the terminal SW3, a fourth boot voltage that is a voltage of the terminal BST4 with respect to the potential of the terminal OUT, a sixth boot voltage that is a voltage of the terminal BST6 with respect to the potential of the terminal SW6, and a seventh boot voltage that is a voltage of the terminal BST7 with respect to the potential of the terminal SW7. It is considered here that the drive voltages further include the internal power supply voltage $V_{REG}$. Note that the internal power supply voltage $V_{REG}$ is a positive DC voltage generated according to the input voltage $V_{IN}$ or the output voltage $V_{OUT}$.

The first, second, third, fourth, sixth, and seventh boot voltages are larger than the gate threshold voltages of the power transistors M1, M2, M3, M4, M6, and M7, respectively. The internal power supply voltage $V_{REG}$ is larger than the gate threshold voltages of the power transistors M5 and M8. The gate threshold voltage of each power transistor has a positive voltage value (for example, 0.5 V).

Each of the gate signals G1 to G8 has a signal level that is one of the high level and the low level. The gate signals G1, G2, G3, G4, G6, and G7 in the high level have the potentials of the terminals BST1, BST2, BST3, BST4, BST6, and BST7, respectively. The gate signals G1, G2, G3, G4, G6, and G7 in the low level have the potentials of the terminals SW1, SW2, SW3, OUT, SW6, and SW7, respectively. The gate signals G5 and G8 in the high level have the potential of the internal power supply voltage $V_{REG}$. The gate signals G5 and G8 in the low level have the ground potential.

Therefore, the power transistors M1, M2, M3, M4, M5, M6, M7, and M8 are in the on-state when the gate signals G1, G2, G3, G4, G5, G6, G7, and G8 are in the high level, respectively. The power transistors M1, M2, M3, M4, M5, M6, M7, and M8 are in the off-state when the gate signal G1, G2, G3, G4, G5, G6, G7, and G8 are in the low level, respectively.

FIG. 9 illustrates a timing chart of switching control SC that can be executed by the power supply IC 2. It can be understood that the switching control SC is realized by cooperation of the control block 10 and the drive block 20. In the switching control SC, the control block 10 generates control signals CNT1 and CNT2 as the control signals CNT (see FIG. 6) and outputs the control signals CNT1 and CNT2 to the drive block 20. In the switching control SC, the control signals CNT1 and CNT2 are square wave signals with a frequency $f_{SW}$ in which the signal level is alternately switched to the high level and the low level. The frequency $f_{SW}$ corresponds to a switching frequency of the power transistors M1 to M8.

That is, the control signal CNT1 is alternately switched to the high level and the low level in the switching control SC, and the length of the high level period of the control signal CNT1 and the length of the low level period of the control signal CNT1 in one cycle of the control signal CNT1 are equal to each other. Therefore, the duty of the control signal CNT1 is 50%. The reciprocal of one cycle of the control signal CNT1 is the frequency $f_{SW}$. In the switching control SC, the control signal CNT2 is also alternately switched to the high level and the low level. Here, the phase of the control signal CNT1 and the phase of the control signal CNT2 are shifted from each other by 180 degrees. Therefore, the control signal CNT2 is in the low level when the control signal CNT1 is in the high level, and the control signal CNT2 is in the high level when the control signal CNT1 is in the low level in the switching control SC. The period in which the control signal CNT1 is in the high level and the control signal CNT2 is in the low level will be referred to as a period P1, and the period in which the control signal CNT1 is in the low level and the control signal CNT2 is in the high level will be referred to as a period P2. The periods P1 and P2 alternately and repeatedly come in the switching control SC, and the repetition frequency of the periods P1 and P2 is the frequency $f_{SW}$.

In the switching control SC, the control signal CNT1 functions as a control signal for the gate drivers 21, 23, 25, and 27, and the control signal CNT2 functions as a control signal for the gate drivers 22, 24, 26, and 28.

Figure 10:
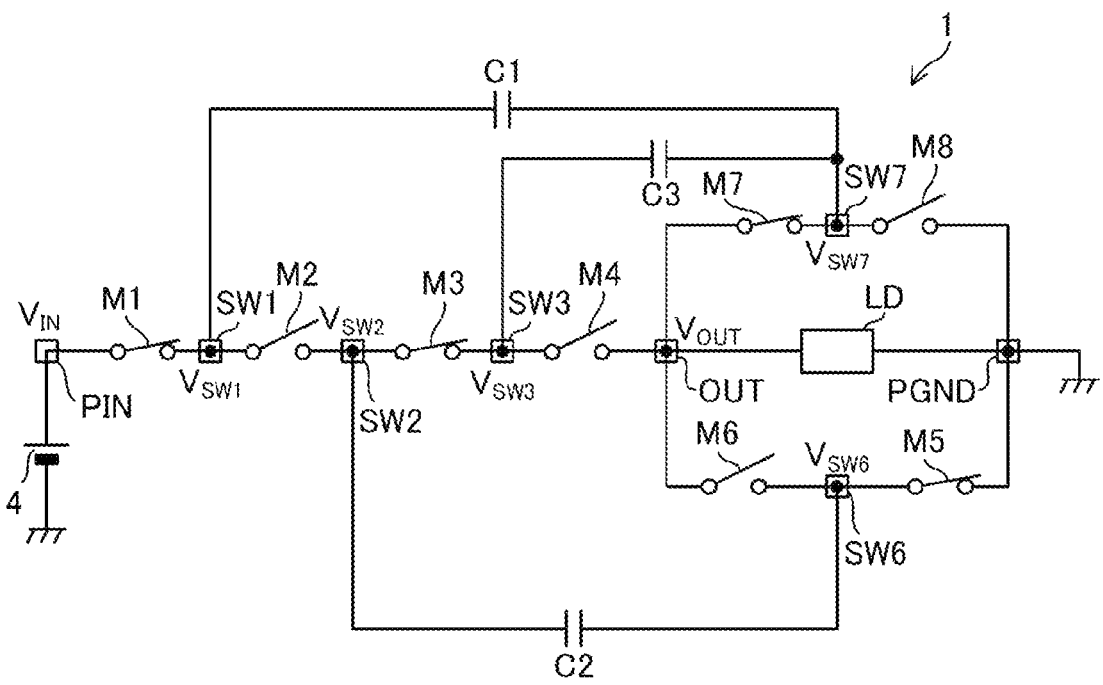
FIG. 10 depicts the state of each switch element in a period (P1) of the switching control according to the embodiment of the present disclosure.

In the period P1, the gate drivers 21, 23, 25, and 27 supply the gate signals G1, G3, G5, and G7 in the high level to the gates of the power transistors M1, M3, M5, and M7, respectively, according to the control signal CNT1 in the high level. In the period P1, the gate drivers 22, 24, 26, and 28 supply the gate signals G2, G4, G6, and G8 in the low level to the gates of the power transistors M2, M4, M6, and M8, respectively, according to the control signal CNT2 in the low level. Therefore, in the period P1, the power transistors M1, M3, M5, and M7 are controlled to enter the on-state, and the power transistors M2, M4, M6, and M8 are controlled to enter the off-state as illustrated in FIG. 10.

Figure 11:
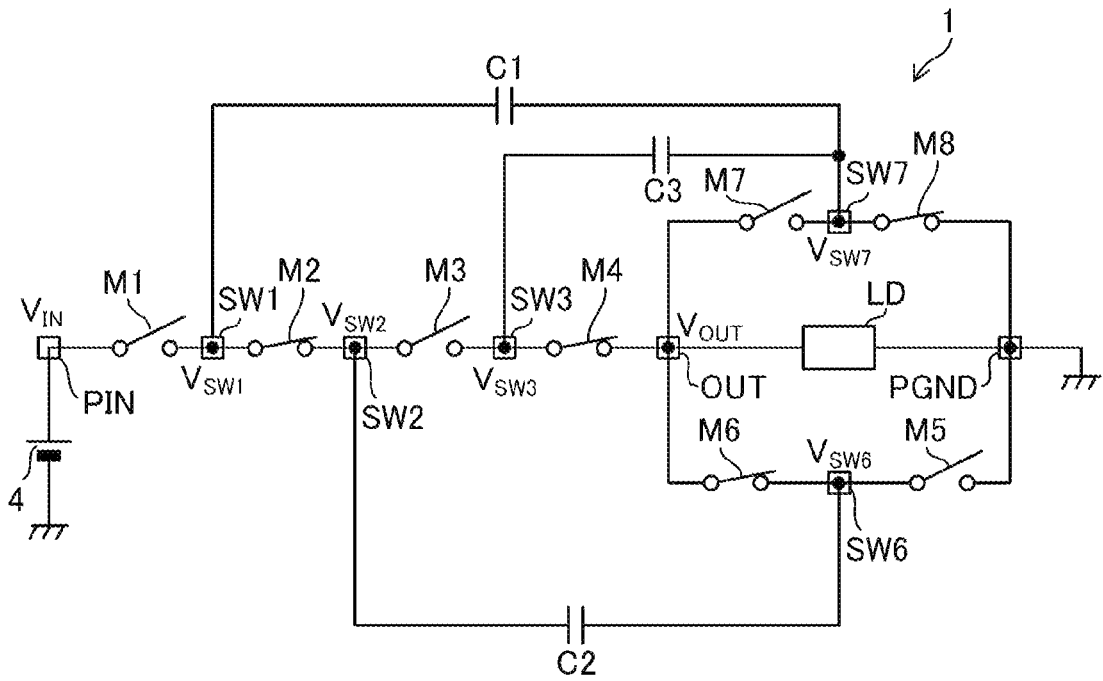
FIG. 11 depicts the state of each switch element in another period (P2) of the switching control according to the embodiment of the present disclosure.

In the period P2, the gate drivers 21, 23, 25, and 27 supply the gate signals G1, G3, G5, and G7 in the low level to the gates of the power transistors M1, M3, M5, and M7, respectively, according to the control signal CNT1 in the low level. In the period P2, the gate drivers 22, 24, 26, and 28 supply the gate signals G2, G4, G6, and G8 in the high level to the gates of the power transistors M2, M4, M6, and M8, respectively, according to the control signal CNT2 in the high level. Therefore, in the period P2, the power transistors M1, M3, M5, and M7 are controlled to enter the off-state, and the power transistors M2, M4, M6, and M8 are controlled to enter the on-state as illustrated in FIG. 11.

FIG. 12 illustrates voltage waveforms of the terminals in the switching control SC. In FIG. 12, square-wave solid-line waveforms represent the waveforms of the voltages $V_{SW1}$ and $V_{SW3}$ in the switching control SC, and square-wave dashed-line waveforms represent the waveforms of the voltages $V_{SW2}$ and $V_{SW6}$ in the switching control SC. Although FIG. 12 does not illustrate the waveform of the voltage $V_{SW7}$ to prevent the complication of the illustration, the waveform of the voltage $V_{SW7}$ is an inverted waveform of the voltage $V_{SW6}$. FIG. 12 illustrates the terminal voltages after stabilization of the output voltage $V_{OUT}$ of the SCC 1.

The output voltage $V_{OUT}$ substantially coincides with a voltage ($V_{IN} \times 1/4$) after the stabilization of the output voltage $V_{OUT}$ of the SCC 1.

In the period P1 of the switching control SC, the voltage $V_{SW1}$ substantially coincides with the input voltage $V_{IN}$, and the voltages $V_{SW2}$ and $V_{SW3}$ substantially coincide with a voltage ($V_{IN} \times 1/2$). The voltage $V_{SW6}$ substantially coincides with 0 V, and the voltage $V_{SW7}$ not illustrated in FIG. 12 substantially coincides with the voltage ($V_{IN} \times 1/4$). In the period P2 of the switching control SC, the voltages $V_{SW1}$ and $V_{SW2}$ substantially coincide with a voltage ($V_{IN} \times 3/4$), and the voltages $V_{SW3}$ and $V_{SW6}$ substantially coincide with the voltage ($V_{IN} \times 1/4$). The voltage $V_{SW7}$ not illustrated in FIG. 12 substantially coincides with 0 V.

FIG. 13 illustrates an array of external terminals when the casing CS of the power supply IC 2 is observed from the back side. The shape of the back side of the casing CS is substantially square, and four sides of the square will be referred to as sides SD1 to SD4. The back side of the casing CS is parallel to an X-axis and a Y-axis orthogonal to each other. The sides SD1 and SD3 are two sides facing each other and parallel to the X-axis. The sides SD2 and SD4 are two sides facing each other and parallel to the Y-axis. External terminals with pin numbers 1 to 24 (that is, 24 external terminals in total) are provided on the power supply IC 2.

The external terminals with pin numbers 1 to 6 are provided on the side SD1. The external terminals with pin numbers 1, 2, 3, 4, 5, and 6 are provided in this order from the negative side to the positive side of the X-axis along the side SD1. The external terminals with pin numbers 7 to 12 are provided on the side SD2. The external terminals with pin numbers 7, 8, 9, 10, 11, and 12 are provided in this order from the negative side to the positive side of the Y-axis along the side SD2. The external terminals with pin numbers 13 to 18 are provided on the side SD3. The external terminals with pin numbers 13, 14, 15, 16, 17, and 18 are provided in this order from the positive side to the negative side of the X-axis along the side SD3. The external terminals with pin numbers 19 to 24 are provided on the side SD4. The external terminals with pin numbers 19, 20, 21, 22, 23, and 24 are provided in this order from the positive side to the negative side of the Y-axis along the side SD4.

The external terminals with pin numbers 1, 2, 3, 4, 5, and 6 are terminals PIN, IN, EN, VREG, NC1, and BST2, respectively. The external terminals with pin numbers 7, 8, 9, 10, 11, and 12 are terminals BST3, NC2, RT, GND, EXTVCC, and BST4, respectively. The external terminals with pin numbers 13, 14, 15, 16, 17, and 18 are terminals PG, BST7, NC3, BST6, SW6, and PGND, respectively. The external terminals with pin numbers 19, 20, 21, 22, 23, and 24 are terminals SW7, OUT, SW3, SW2, SW1, and BST1, respectively.

Functions of the terminals not illustrated in FIG. 2 or FIG. 7 among the external terminals with pin number 1 to 24 will be described. The terminal IN is a power supply input terminal of the internal circuit of the power supply IC 2. The input voltage $V_{IN}$ is supplied to the terminal IN in the present embodiment. The internal circuit (for example, the control block 10) of the power supply IC 2 is driven according to the voltage supplied to the terminal IN. The terminal EN is an enable terminal. The power supply IC 2 is activated or stopped according to the voltage applied to the terminal EN. The internal power supply voltage $V_{REG}$ described above is applied to the terminal VREG. The terminals NC1 to NC3 are not connected to the semiconductor chip CP and do not have any effect on the operation of the power supply IC 2.

The terminal RT is a frequency setting terminal. A resistor for setting the frequency is provided between the terminal RT and the ground, outside the power supply IC 2. The control block 10 variably sets the frequency $f_{SW}$ described above according to the value of the resistor for setting the frequency. The terminal GND is a ground terminal, and the terminal GND is connected to the ground, as with the terminal PGND.

The terminal EXTVCC can be connected to the terminal OUT or the ground. When the terminal EXTVCC is connected to the terminal OUT, the internal power supply voltage $V_{REG}$ is generated in the power supply IC 2 according to the output voltage $V_{OUT}$ supplied to the terminal EXTVCC. When the terminal EXTVCC is connected to the ground, the internal power supply voltage $V_{REG}$ is generated in the power supply IC 2 according to the input voltage $V_{IN}$ supplied to the terminal IN. The terminal PG is a power-good terminal. The terminal PG is connected to an open-drain circuit inside the power supply IC 2, and a signal corresponding to whether there is an abnormality or other faults in the power supply IC 2 is output from the terminal PG.

<Protection from Short-Circuit>

A general buck DC/DC converter includes a half-bridge circuit including a high-side transistor and a low-side transistor and alternately turns on and off the high-side transistor and the low-side transistor. This generates a square wave voltage at a connection node between the high-side transistor and the low-side transistor. An inductor and a capacitor rectify and smooth the square wave voltage to generate an output voltage at an output terminal. When a ground fault occurs at the output terminal in this type of buck DC/DC converter, the action of the inductor gradually increases the current flowing through the half-bridge circuit. Therefore, after a while from the occurrence of the ground fault, there is no problem in turning off the high-side transistor to protect the high-side transistor from the ground fault.

In the SCC 1, the current of the power transistor rapidly increases when there is an output ground fault. The output ground fault in the SCC 1 means that the terminal OUT as an output terminal is short-circuited to the ground. The state in which there is an output ground fault will be referred to as an output ground fault state.

FIG. 14 illustrates a waveform 610 of a drain current $I_D\_M1$ of the power transistor M1 (it is assumed here that the waveform 610 is a waveform when the protection operation described later is not performed). It is assumed in FIG. 14 that the state without the output ground fault is shifted to the state with the output ground fault at time $T_{A1}$. The output ground fault leads to a rapid increase in the drain current $I_D\_M1$ when the power transistor M1 is turned on. Similar is true when there is an abnormality of short-circuit across the capacitor C1, C2, or C3 (hereinafter, referred to as capacitor short-circuit abnormality).

Figure 15:
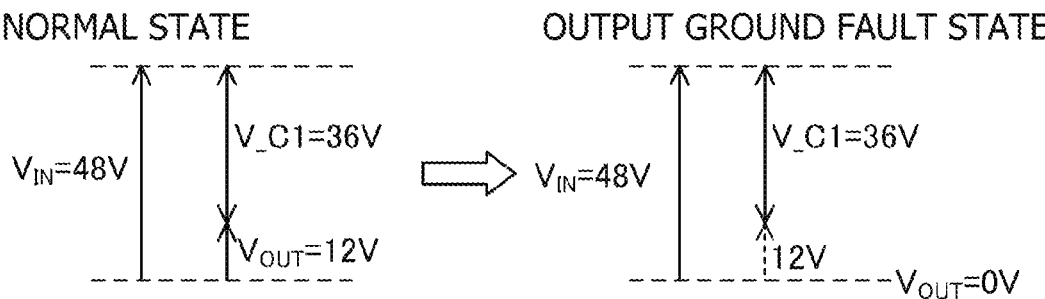
FIG. 15 is a diagram for describing a large charge movement when a specific power transistor is turned on due to a shift from a normal state to an output ground fault state.

As illustrated in FIG. 15, a voltage V_C1 applied across the capacitor C1 is 36 V equivalent to the difference between the input voltage $V_{IN}$ (48 V) and the output voltage $V_{OUT}$ (12 V) in a normal state without the ground fault or the capacitor short-circuit abnormality. Assuming that the current flowing through the load LD is zero in the normal state, the charge does not move through the capacitor C1 when the power transistors M1 to M8 are switched, and therefore, the current does not flow through the power transistor M1 (ignoring leakage of charge and the like). When the power transistor M1 is turned on after the occurrence of the output ground fault, the potential difference of 12 V on the basis of the normal state is additionally applied to the capacitor C1, and there is a large charge movement through the power transistor M1.

The power transistor needs to be promptly turned off to protect the power transistor when there is an abnormality such as an output ground fault. A significantly larger current flows through the power transistor when there is an abnormality in the SCC 1 compared to the normal time, and this characteristic can be used to protect the power transistor. The flowing current significantly varies between the normal time and the abnormal time, and there is no need to set a detailed threshold voltage. For example, in the case of a MOSFET, it can be determined that the state is normal if an operation region of the MOSFET belongs to a linear region, and it can be determined that the state is abnormal if the operation region belongs to a saturation region.

Figure 16:
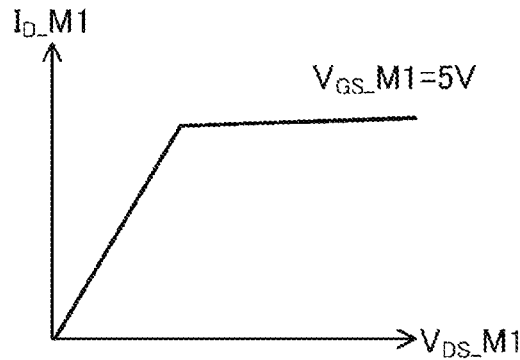
FIG. 16 depicts characteristics of the power transistor.

FIG. 16 illustrates a relation between a drain-source voltage $V_{DS}\_M1$ of the power transistor M1 and the drain current $I_D\_M1$ of the power transistor M1. It is assumed in FIG. 16 that a gate-source voltage $V_{GS}\_M1$ of the power transistor M1 is maintained at a certain voltage sufficiently larger than the gate threshold voltage. The power transistor M1 operates in the linear region when the voltage $V_{GS}\_M1$ is relatively small, and the drain current $I_D\_M1$ linearly increases with an increase in the voltage $V_{GS}\_M1$. When the voltage $V_{GS}\_M1$ becomes equal to or greater than a certain value, the power transistor M1 operates in the saturation region, and the drain current $I_D\_M1$ hardly changes with an increase in the voltage $V_{DS}\_M1$. To put it differently, it can be determined that an output short-circuit or other abnormalities has occurred if the voltage $V_{DS}\_M1$ becomes equal to or greater than a certain voltage value when an abnormally large drain current $I_D\_M1$ is applied while the gate signal G1 is in the high level.

Figure 17:
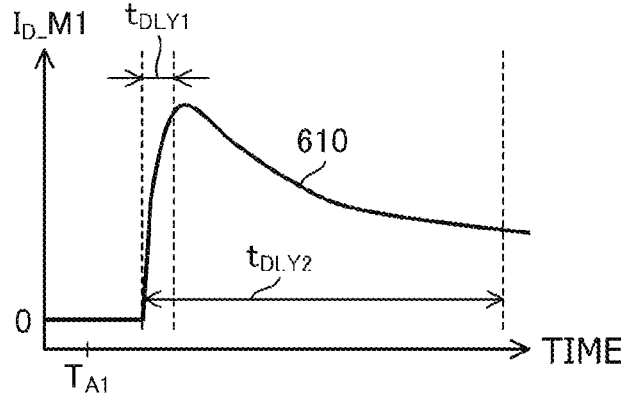
FIG. 17 is an enlarged waveform diagram of the drain current of a specific power transistor when there is an output ground fault (assuming that the protection operation is not performed)

In general, the delay time of a high-precision comparator is approximately several dozen to 100 ns (nanoseconds). If the high-precision comparator is used for the protection from the output ground fault or other abnormalities, an excessive current continues to flow in the delay time of the high-precision comparator. The increase in the time of the excessive current flow may increase the damage to the constituent parts (for example, power transistor M1) of the SCC 1. As described above, the detailed threshold voltage does not have to be set. Therefore, a low-precision comparator can be used to increase the speed, and the time before the protection can also be reduced to, for example, approximately several to ten ns (nanoseconds). FIG. 17 is an enlarged view of the waveform 610 of the drain current $I_D\_M1$ when the power transistor M1 is turned on after time $T_{A1}$ of FIG. 14. While an excessive current continues to flow in a delay time $t_{DLY2}$ of the high-precision comparator when the high-precision comparator is used to protect the constituent parts, a low-precision comparator can be used to reduce the time of the excessive current flow to a delay time $t_{DLY1}$ of the low-precision comparator ($t_{DLY1} < t_{DLY2}$). The low-precision comparator here corresponds to a comparator 123 described later (see FIG. 19).

Figure 18:
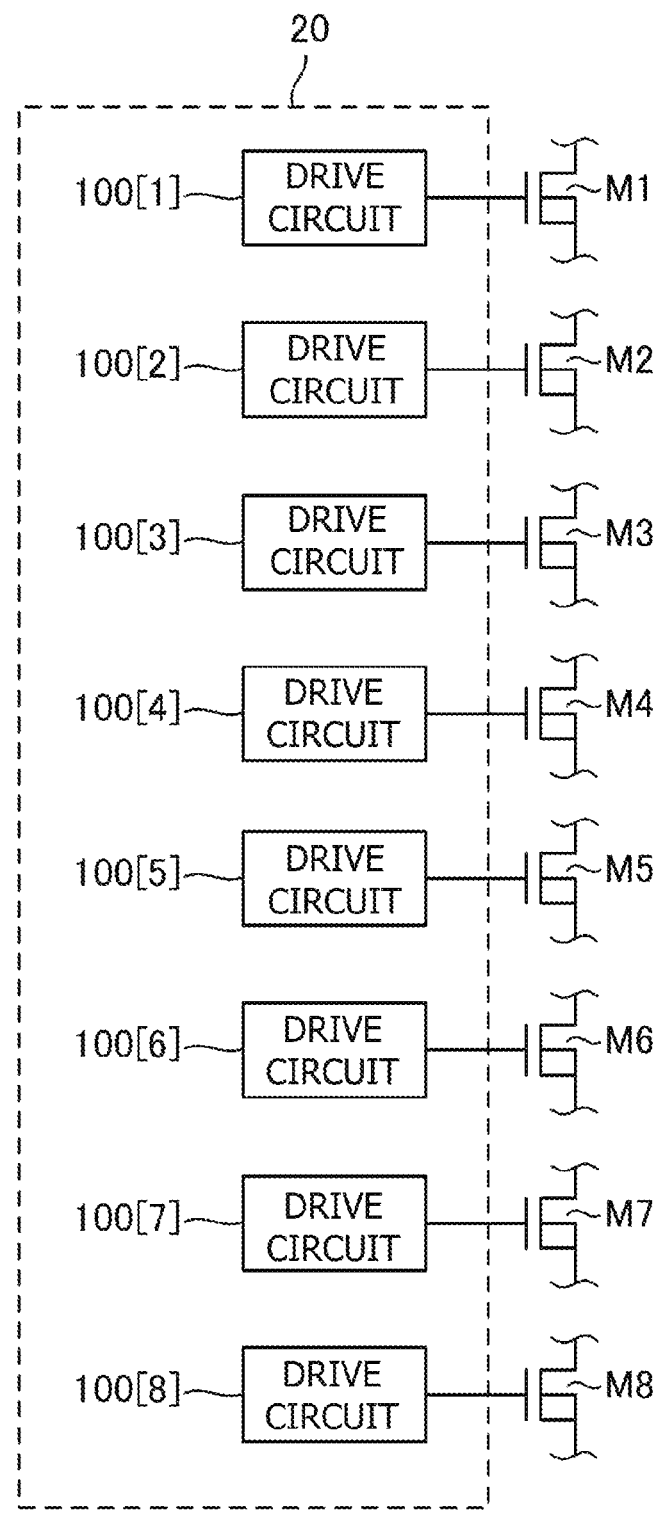
FIG. 18 depicts that a drive circuit is provided for each power transistor according to the embodiment of the present disclosure.

Although the behavior of the drain current of the power transistor M1 and the protection of the power transistor M1 during the output ground fault or the short-circuit of the capacitor C1, C2, or C3 have been described, similar is true for any abnormality in which an excessive current flows through any one of the power transistors M1 to M8. Circuits that can perform the protection operation against the abnormality are provided on the drive block 20 (FIG. 6). As illustrated in FIG. 18, the drive block 20 includes drive circuits corresponding to the power transistors. The drive circuits provided for the power transistors M1 to M8 in the drive block 20 are drive circuits 100[1] to 100[8], respectively. The drive circuits 100[1] to 100[8] may have the same configuration.

Figure 19:
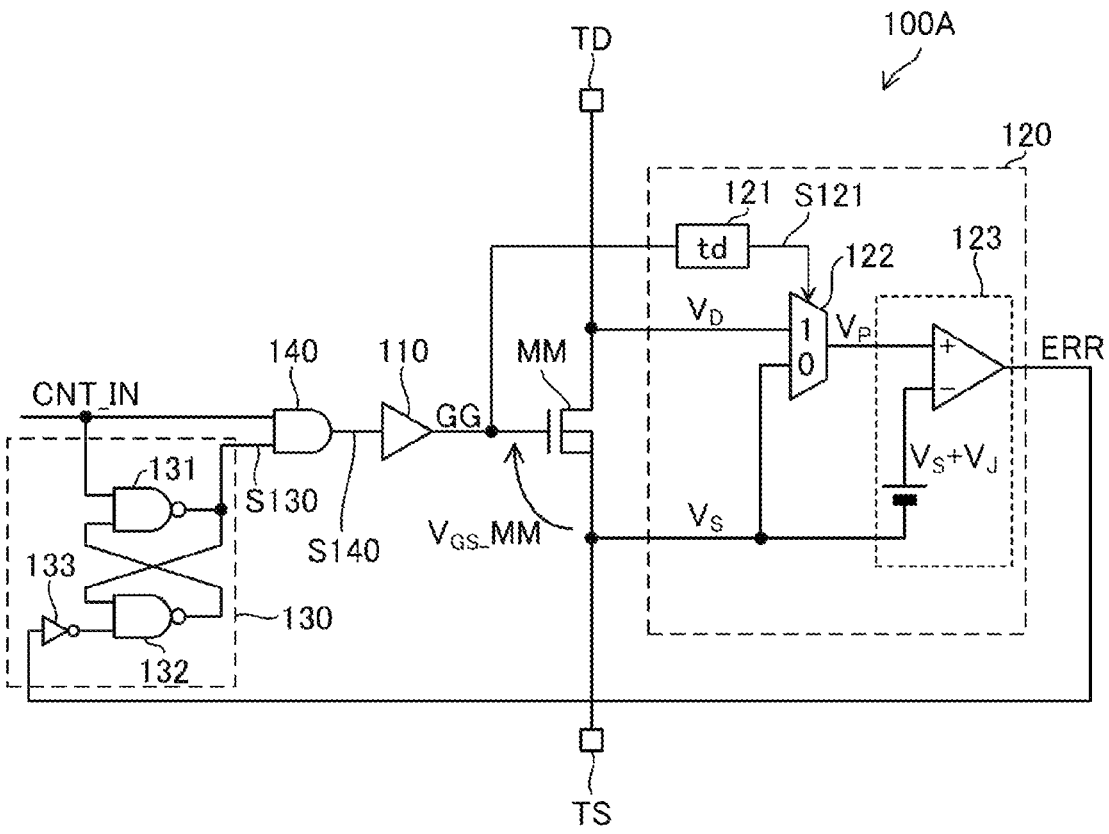
FIG. 19 is a circuit diagram of the drive circuit according to the embodiment of the present disclosure.

FIG. 19 illustrates a circuit diagram of a drive circuit 100A. The configuration of each of the drive circuits 100[1] to 100[8] can be the same as the configuration of the drive circuit 100A.

In FIG. 19, a transistor MM is a power transistor connected to the drive circuit 100A. A gate driver 110 is provided on the drive circuit 100A. The signal applied to the gate of the power transistor MM is a gate signal GG. The output terminal of the gate driver 110 is connected to the gate of the power transistor MM, and the gate driver 110 outputs the gate signal GG from the output terminal of the gate driver 110. The drain of the power transistor MM is connected to a terminal TD, and the source of the power transistor MM is connected to a terminal TS.

When the drive circuits 100A include the drive circuits 100[1], 100[2], 100[3], 100[4], 100[5], 100[6], 100[7], and 100[8], the power transistors MM include the power transistors M1, M2, M3, M4, M5, M6, M7, and M8, respectively. The gate drivers 110 include the gate drivers 21, 22, 23, 24, 25, 26, 27, and 28 (see FIG. 7). The gate signals GG include the gate signals G1, G2, G3, G4, G5, G6, G7, and G8 (see FIG. 7). The terminals TD include the terminals PIN, SW1, SW2, SW3, SW6, OUT, OUT, and SW7 (see FIG. 2 and the like). The terminals TS include the terminals SW1, SW2, SW3, OUT, PGND, SW6, SW7, and PGND.

A control signal CNT_IN is input to the drive circuit 100A. The control signal CNT_IN is a control signal for the power transistor MM (signal for designating ON or OFF of the power transistor MM), and the control signal CNT_IN is supplied from the control block 10 (see FIG. 6). When the drive circuit 100A is one of the drive circuits 100[1], 100[3], 100[5], and 100[7], the control signal CNT_IN is the control signal CNT1 (see FIG. 9). When the drive circuit 100A is one of the drive circuits 100[2], 100[4], 100[6], and 100[8], the control signal CNT_IN is the control signal CNT2 (see FIG. 9).

In addition to the gate driver 110, an abnormality detection circuit 120, a latch circuit 130, and a circuit 140 that is an AND circuit are provided on the drive circuit 100A. Note that a symbol "$V_{GS}\_MM$" will be used to refer to the gate-source voltage of the power transistor MM, and the voltage will be referred to as a gate-source voltage $V_{GS}\_MM$ or simply as a voltage $V_{GS}\_MM$. A symbol "Vth" will be used to refer to the gate threshold voltage of the power transistor MM. The voltage at the source of the power transistor MM will be referred to as a source voltage $V_S$, and the voltage at the drain of the power transistor MM will be referred to as a drain voltage $V_D$. The drive circuit 100A operates in reference to the source potential of the power transistor MM.

Figure 20:
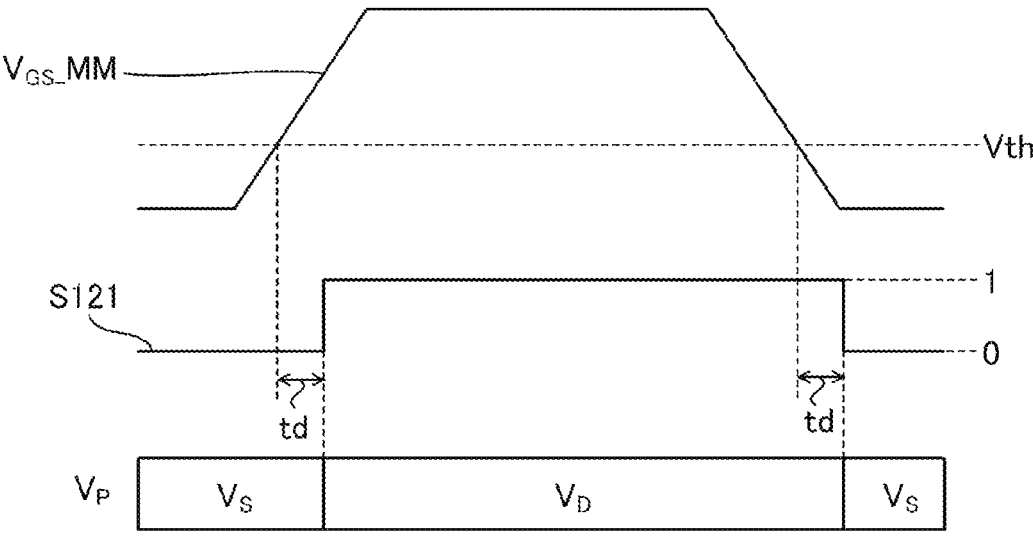
FIG. 20 is a diagram for describing operations of a delay circuit and a selector in the drive circuit according to the embodiment of the present disclosure.

The abnormality detection circuit 120 includes a delay circuit 121, a selector 122, and the comparator 123. The delay circuit 121 is connected to the gate of the power transistor MM and outputs a signal S121 with a value of "0" or "1" according to the voltage $V_{GS}\_MM$. FIG. 20 illustrates a relation between the voltage $V_{GS}\_MM$ and the signal S121 (voltage $V_P$ illustrated in FIG. 20 will be described later). The delay circuit 121 has a function of comparing the voltage $V_{GS}\_MM$ with the gate threshold voltage Vth and outputs the signal S121 that is a signal obtained by providing a delay to the comparison result signal. When the state in which the voltage $V_{GS}\_MM$ is lower than the gate threshold voltage Vth is maintained, the value of the signal S121 is "0." Once the state "$V_{GS}$_MM<Vth" is shifted to the state "$V_{GS}$_MM>Vth" when the value of the signal S121 is "0," the delay circuit 121 switches the value of the signal S121 from "0" to "1" after a predetermined delay time td from the shift. Subsequently, when the state returns to the state "$V_{GS}$_MM<Vth," the delay circuit 121 switches the value of the signal S121 from "1" to "0" after the predetermined delay time td from the return.

The selector 122 includes a first input terminal connected to the source of the power transistor MM and configured to receive the source voltage $V_S$, a second input terminal connected to the drain of the power transistor MM and configured to receive the drain voltage $V_D$, a control terminal configured to receive the signal S121, and an output terminal. The selector 122 outputs a signal at the first input terminal (that is, a signal with the source voltage $V_S$) from the output terminal when the value of the signal S121 is "0." The selector 122 outputs a signal at the second input terminal (that is, a signal with the drain voltage $V_D$) from the output terminal when the value of the signal S121 is "1." The voltage of the signal output from the output terminal of the selector 122 will be referred to as a voltage $V_P$. Therefore, the source voltage $V_S$ is output as the voltage $V_P$ from the selector 122 when the value of the signal S121 is "0," and the drain voltage $V_D$ is output as the voltage $V_P$ from the selector 122 when the value of the signal S121 is "1" as illustrated in FIG. 20.

The comparator 123 is connected to the output terminal of the selector 122 and the source of the power transistor MM. The comparator 123 compares the voltage $V_P$ with a voltage ($V_S$+$V_J$) and outputs a detection signal ERR corresponding to the comparison result. The voltage ($V_S$+$V_J$) is a predetermined determination voltage $V_J$ higher than the source voltage $V_S$. The determination voltage $V_J$ has a predetermined positive voltage value. The detection signal ERR is a binary signal in a high level or a low level. The comparator 123 outputs the detection signal ERR in the high level if the voltage $V_P$ is higher than the voltage ($V_S$+$V_J$) and outputs the detection signal ERR in the low level if the voltage $V_P$ is lower than the voltage ($V_S$+$V_J$). The detection signal ERR is in the high level or the low level in the case of "$V_P$=$V_S$+$V_J$." Here, the detection signal ERR in the high level functions as a detection signal ERR in the asserted state, and the detection signal ERR in the low level functions as a detection signal ERR in the negated state.

The comparator 123 may be configured to determine in which one of the linear region and the saturation region the power transistor MM operates when the power transistor MM is in the on-state. In this case, when the gate signal GG in the high level is supplied to the gate of the power transistor MM, the drain-source voltage (that is, the drain voltage with respect to the source potential) of the power transistor MM is smaller than the determination voltage $V_J$ if the power transistor MM operates in the linear region, and the drain-source voltage is larger than the determination voltage $V_J$ if the power transistor MM operates in the saturation region. The comparator 123 outputs the detection signal ERR in the low level when the comparator 123 determines that the power transistor MM operates in the linear region. The comparator 123 outputs the detection signal ERR in the high level when the comparator 123 determines that the power transistor MM operates in the saturation region.

The latch circuit 130 includes circuits 131 to 133. The circuit 133 is an inverter circuit. The circuit 133 receives the detection signal ERR from the comparator 123 and outputs an inverted signal of the detection signal ERR. Therefore, the output signal of the circuit 133 is in the low level if the detection signal ERR is in the high level. The output signal of the circuit 133 is in the high level if the detection signal ERR is in the low level. The circuits 131 and 132 are two-input NAND circuits. The circuit 131 receives the control signal CNT_IN and the output signal of the circuit 132. The circuit 131 outputs a signal in the low level only if both the control signal CNT_IN and the output signal of the circuit 132 are in the high level. The circuit 131 outputs a signal in the high level in other cases. The circuit 132 receives the output signal of the circuit 131 and the output signal of the circuit 133. The circuit 132 outputs a signal in the low level only if both the output signal of the circuit 131 and the output signal of the circuit 133 are in the high level. The circuit 132 outputs a signal in the high level in other cases. The output signal of the circuit 131 is output as an output signal S130 of the latch circuit 130 to the circuit 140.

The circuit 140 is a two-input AND circuit. The circuit 140 receives the control signal CNT_IN and the output signal S130 of the latch circuit 130. The circuit 140 outputs a signal S140 in the high level only if both the control signal CNT_IN and the output signal S130 of the latch circuit 130 are in the high level. The circuit 140 outputs a signal S140 in the low level in other cases. The signal S140 is supplied to the gate driver 110.

The gate driver 110 supplies the gate signal GG in the high level to the gate of the power transistor MM to turn on the power transistor MM when the output signal S140 of the circuit 140 is in the high level. The gate driver 110 supplies the gate signal GG in the low level to the gate of the power transistor MM to turn off the power transistor MM when the output signal S140 of the circuit 140 is in the low level. The gate signal GG is a voltage signal in reference to the potential of the terminal TS. The voltage $V_{GS}$_MM is larger than the gate threshold voltage Vth when the gate signal GG is in the high level. The voltage $V_{GS}$_MM is smaller than the gate threshold voltage Vth and may be substantially 0 V when the gate signal GG is in the low level.

Figure 21:
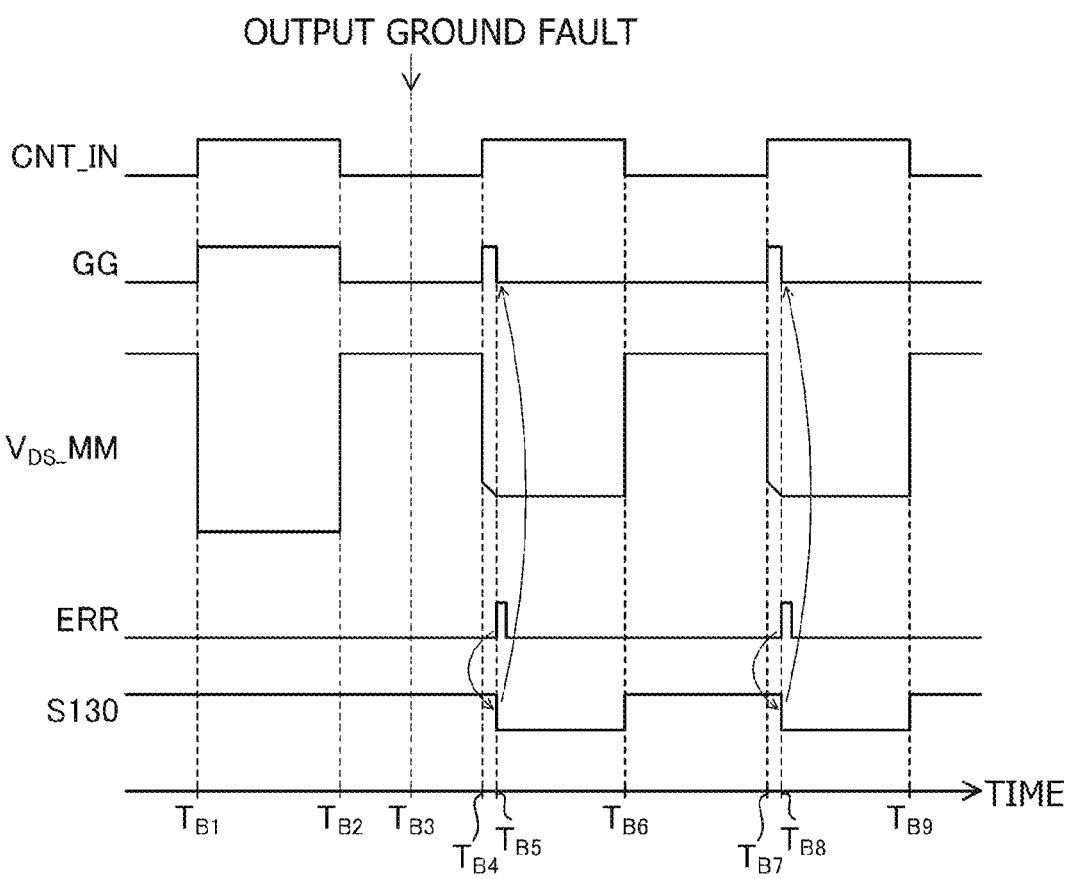
FIG. 21 is a timing chart of the drive circuit in FIG. 19 according to the embodiment of the present disclosure.

FIG. 21 illustrates a timing chart of the drive circuit 100A. The operation of the drive circuit 100A will be described with reference to FIG. 21. For a freely selected natural number i, it is assumed that time $T_{Bi+1}$ is time later than time $T_{Bi}$. It is assumed that the SCC 1 is maintained in the normal state before time $T_{B3}$ (see FIG. 15), and the SCC 1 is shifted from the normal state to the output ground fault state at time $T_{B3}$. FIG. 21 illustrates waveforms of the control signal CNT_IN, the gate signal GG, a voltage $V_{DS}$_MM, the detection signal ERR, and the signal S130 from top to bottom. The voltage $V_{DS}$_MM represents the drain-source voltage of the power transistor MM (that is, the drain voltage with respect to the source potential).

The control signal CNT_IN is a square wave signal with the frequency $f_{SW}$ and the duty of 50%. There is an up edge in the control signal CNT_IN at time $T_{B1}$. Time $T_{B4}$ is one cycle of the control signal CNT_IN after time $T_{B1}$, and time $T_{B7}$ is two cycles of the control signal CNT_IN after time $T_{B1}$. Therefore, there is also an up edge in the control signal CNT_IN at each of time $T_{B4}$ and time $T_{B7}$. Time $T_{B2}$ is a half cycle of the control signal CNT_IN after time $T_{B1}$. Time $T_{B6}$ is a half cycle of the control signal CNT_IN after time $T_{B4}$. Time $T_{B9}$ is a half cycle of the control signal CNT_IN after time $T_{B7}$. Therefore, there is a down edge in the control signal CNT_IN at each of time $T_{B2}$, time $T_{B6}$, and time $T_{B9}$. Just before time $T_{B1}$, the control signal CNT_IN is in the low level, and therefore, the gate signal GG is in the low level. The power transistor MM is OFF, and "$V_P$=$V_S$" holds. As a result, the detection signal ERR is in the low level (negated state). Therefore, the signal $130 is in the high level just before time $T_{B1}$.

The control signal CNT_IN is equivalent to a set signal for the latch circuit 130. The signal S130 is maintained in the high level even when there is an up edge in the control signal CNT_IN at time $T_{B1}$. Therefore, there is an up edge in the gate signal GG in response to the up edge of the control signal CNT_IN at time $T_{B1}$. The power transistor MM is turned on in response to the up edge of the gate signal GG, and the voltage $V_{DS\_}$MM is reduced to a sufficiently low voltage. Subsequently, there is a down edge in the gate signal GG in response to the down edge of the control signal CNT_IN at time $T_{B2}$. The power transistor MM is turned off, and as a result, the voltage $V_{DS\_}$MM rises. In the normal state, the drain current flowing through the power transistor MM is relatively small when the power transistor MM is ON. As a result, "$V_P<V_S+V_J$" is maintained, and the detection signal ERR is maintained in the low level. Since the detection signal ERR is maintained in the low level, the output signal S130 of the latch circuit 130 is maintained in the high level.

After the occurrence of the output ground fault at time $T_{B3}$, there is an up edge in the control signal CNT_IN at time $T_{B4}$. The detection signal ERR at this point is in the low level, and there is also an up edge in the gate signal GG in response to the up edge of the control signal CNT_IN at time $T_{B4}$. As a result, the power transistor MM is turned on. At time $T_{B5}$ after the delay time td from time $T_{B4}$, the voltage $V_P$ input to the comparator 123 is switched from the source voltage $V_S$ to the drain voltage $V_D$. Due to the influence of the output ground fault, the drain current of the power transistor MM is significantly large between time $T_{B4}$ and time $T_{B5}$, and as a result, "$V_D>V_S+V_J$" holds. Therefore, the voltage $V_P$ is switched to the drain voltage $V_D$ at time $T_{B5}$, and there is an up edge in the detection signal ERR. While the power transistor MM operates in the linear region in the normal state, the power transistor MM may operate in the saturation region in the output ground fault state.

The detection signal ERR is equivalent to a reset signal for the latch circuit 130. The up edge of the detection signal ERR at time $T_{B5}$ causes a down edge in the output signal S130 of the latch circuit 130. There is also a down edge in the gate signal GG due to the down edge in the signal S130, and the power transistor MM is turned off. Although the voltage $V_{DS\_}$MM may change after the power transistor MM is turned off at time $T_{B5}$, the voltage $V_{DS\_}$MM hardly changes unless the charge does not move through the terminal TD or TS after the power transistor MM is turned off at time $T_{B5}$.

Due to the down edge in the gate signal GG triggered by the down edge in the signal S130 at time $T_{B5}$, the state "$V_P=V_D$" is switched to the state "$V_P=V_S$" after the delay time td. Therefore, there is a down edge in the detection signal ERR (assuming that the time of the down edge is before time $T_{B6}$). However, the latch circuit 130 maintains the low level of the signal S130, and the low level of the gate signal GG and the off-state of the power transistor MM are maintained.

Subsequently, there is a down edge in the control signal CNT_IN at time $T_{B6}$. The detection signal ERR is in the low level at this point, and the function of the latch circuit 130 causes an up edge in the signal S130. Therefore, the same operation as the operation at time $T_{B4}$, $T_{B5}$, and $T_{B6}$ is repeated at subsequent time $T_{B7}$, $T_{B8}$, and $T_{B9}$.

The drive circuit 100A of FIG. 19 can be used to promptly turn off the power transistor MM to protect the power transistor MM and the like when an excessive current flows through the power transistor MM due to the output ground fault or other abnormalities. The comparator 123 may be a low-precision comparator capable of fast operation, and the fast operation of the comparator 123 can sufficiently reduce the time of the excessive current flowing through the power transistor MM (for example, the time can be reduced to approximately the delay time $t_{DLY1}$ of FIG. 17). Therefore, the damage to the elements (including the power transistor MM) or peripheral parts of the elements through which the excessive current passes can be kept to a manageable level.

Figure 22:
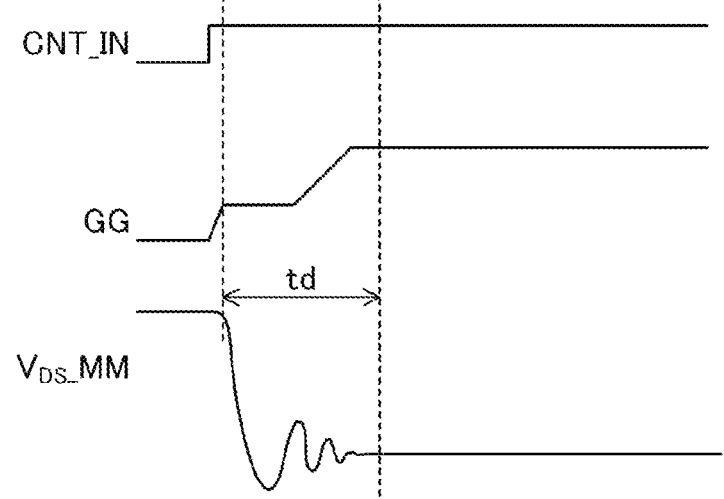
FIG. 22 is a diagram for describing meaning of a delay inserted by the delay circuit in the drive circuit according to the embodiment of the present disclosure.

The meaning of the insertion of the delay time td will be described with reference to FIG. 22. The power transistor MM is switched from the off-state to the on-state when the gate signal GG is switched from the low level to the high level due to the up edge in the control signal CNT_IN. In this case, ringing associated with the switching occurs in the voltage $V_{DS\_}$MM because of the influence of the parasitic inductance or other effects related to the power transistor MM. The delay time td is inserted to switch the input voltage $V_P$ for the comparator 123 from the source voltage $V_S$ to the drain voltage $V_D$ after the ringing is completely or mostly settled down. As a result, appropriate protection can be performed by suppressing the influence of ringing. Here, the delay time td may be zero if the influence of ringing is minor.

Figure 23:
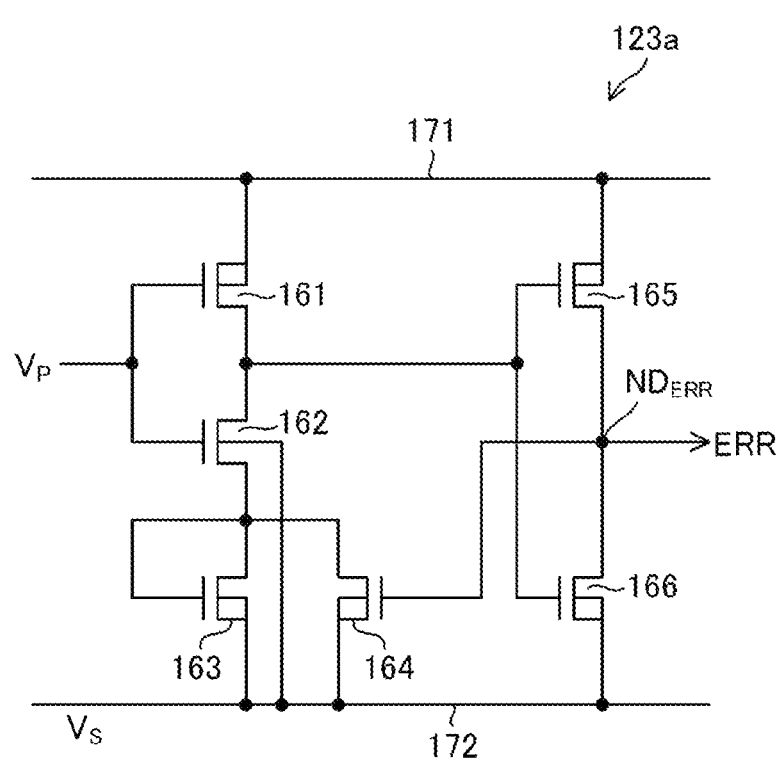
FIG. 23 depicts a circuit example of a comparator in the drive circuit according to the embodiment of the present disclosure.

FIG. 23 illustrates a circuit diagram of a comparator 123a as an example of the comparator 123. It is only sufficient to distinguish whether the power transistor MM operates in the linear region or operates in the saturation region, and the comparator 123a can be a simple low-precision comparator.

The comparator 123a is connected to wires 171 and 172. When the gate driver 110 is the gate driver 21, 22, 23, 24, 26, or 27 (see FIG. 7), the wire 171 is connected to the terminal BST1, BST2, BST3, BST4, BST6, or BST7. When the gate driver 110 is the gate driver 25 or 28 (see FIG. 7), the internal power supply voltage $V_{REG}$ is applied to the wire 171. The wire 172 is connected to the terminal TS, and therefore, the source voltage $V_S$ is applied to the wire 172.

The comparator 123a includes transistors 161 to 166. The transistors 161 and 165 are P-channel MOSFETs, and the transistors 162 to 164 and 166 are N-channel MOSFETs.

The sources of the transistors 161 and 165 are connected to the wire 171. The gates of the transistors 161 and 162 are connected to the output terminal of the selector 122, and the gates receive the voltage $V_P$. The drains of the transistors 161 and 162 are commonly connected to the gates of the transistors 165 and 166. The source of the transistor 162 is connected to the drain and the gate of the transistor 163 and the drain of the transistor 164. The sources of the transistors 163, 164, and 165 are connected to the wire 172. Note that the back gate of the transistor 162 is also connected to the wire 172. The gate of the transistor 164 is connected to a node ND$_{ERR}$ along with the drains of the transistors 165 and 166. The signal at the node ND$_{ERR}$ is the detection signal ERR.

If the voltage $V_P$ is the same as the voltage (that is, the source voltage $V_S$) of the wire 172, the state of the transistors 161, 162, 165, and 166 is a first state. In the first state, the transistor 161 is ON, and the transistor 162 is OFF. The transistor 165 is turned off, and the transistor 166 is turned on due to the rise in the gate potential of the transistors 165 and 166. Therefore, the detection signal ERR is in the low level (level with the potential of the wire 172) in the first state. If the voltage $V_P$ is the same as the voltage of the wire 171, the state of the transistors 161, 162, 165, and 166 is a second state. In the second state, the transistor 161 is OFF, and the transistor 162 is ON. The transistor 165 is turned on, and the transistor 166 is turned off due to the reduction in the gate potential of the transistors 165 and 166. Therefore, the detection signal ERR is in the high level (level with the potential of the wire 171) in the second state.

In the course of the rise in the voltage $V_P$ from the voltage of the wire 172 (that is, the source voltage $V_S$), the state of the transistors 161, 162, 165, and 166 is switched from the first state to the second state, and the detection signal ERR is switched from the low level to the high level. The voltage $V_P$ at the time of the switch in the state of the transistors 161, 162, 165, and 166 from the first state to the second state is equivalent to the determination voltage $V_J$. The determination voltage $V_J$ may be higher than a pinch-off voltage of the power transistor MM of the time that the gate signal GG in the high level is supplied to the gate of the power transistor MM. It can be stated that the comparator 123$a$ outputs the detection signal ERR in the low level or the high level according to which one of the transistors 161 and 162 that receives the voltage $V_P$ at the gate is turned on.

Now, any one of the power transistors M1 to M8 will be referred to as a target power transistor for the convenience, and it is assumed that the target power transistor is the power transistor MM. It can be stated that the drive circuit 100A is a target drive circuit for the target power transistor MM, and it can be stated that the control signal CNT_IN is a target control signal for the target power transistor MM. The target drive circuit 100A supplies the gate signal GG to the target power transistor MM according to the target control signal CNT_IN. In this case, the abnormality detection circuit 120 outputs the detection signal ERR corresponding to the drain-source voltage $V_{DS}$_MM of the target power transistor MM after the gate-source voltage $V_{GS}$_MM of the target power transistor MM exceeds the gate threshold voltage Vth in the course of the switch of the gate signal GG from the low level to the high level. The target drive circuit 100A generates the gate signal GG for the target power transistor MM according to the target detection signal CNT_IN and the detection signal ERR.

More specifically, in response to the change in the target control signal CNT_IN from the low level to the high level, the target drive circuit 100A executes a basic turn-on operation of supplying the gate signal GG in the high level to the target power transistor MM to turn on the target power transistor MM. The supply of the gate signal GG in the high level corresponds to the supply of a voltage exceeding the gate threshold voltage Vth to between the gate and the source of the target power transistor MM. In the timing chart of FIG. 21, the execution of the basic turn-on operation is triggered by the up edge in the target control signal CNT_IN at time $T_{B1}$, $T_{B4}$, and $T_{B7}$.

The target drive circuit 100A can execute a basic turn-off operation after the basic turn-on operation. The basic turn-off operation is an operation of supplying the gate signal GG in the low level to the target power transistor MM to turn off the target power transistor MM in response to the change in the target control signal CNT_IN from the high level to the low level. The supply of the gate signal GG in the low level corresponds to the supply of a voltage lower than the gate threshold voltage Vth to between the gate and the source of the target power transistor MM. In the timing chart of FIG. 21, the execution of the basic turn-off operation is triggered by the down edge in the target control signal CNT_IN at time $T_{B2}$.

After the basic turn-on operation, the abnormality detection circuit 120 sets the drain-source voltage $V_{GS}$_MM of the target power transistor MM as a voltage to be monitored and monitors the voltage (in other words, the abnormality detection circuit 120 receives the source voltage $V_S$ and the drain voltage $V_P$ to monitor the drain-source voltage $V_{GS}$_MM as a voltage to be monitored). The abnormality detection circuit 120 outputs the detection signal ERR in the asserted state (here, the detection signal ERR in the high level) when the voltage to be monitored ($V_{DS}$_MM) exceeds the predetermined determination voltage $V_J$.

After the basic turn-on operation, the target drive circuit 100A executes a protection operation of turning off the target power transistor MM when the detection signal ERR in the asserted state is output from the abnormality detection circuit 120, regardless of the target control signal CNT_IN. In the timing chart of FIG. 21, the operation of turning off the target power transistor MM triggered by the up edge of the detection signal ERR at time $T_{B5}$ and $T_{B8}$ corresponds to the protection operation.

After turning off the target power transistor MM in the protection operation following the basic turn-on operation, the target drive circuit 100A maintains the target power transistor MM in the off-state until there is a change in the target control signal CNT_IN from the low level to the high level (see, for example, the period from time $T_{B5}$ to time $T_{B7}$ in FIG. 21). When the target control CNT_IN changes from the low level to the high level, the target drive circuit 100A executes the basic turn-on operation again (for example, the target drive circuit 100A executes the basic turn-on operation at time $T_{B7}$ in FIG. 21).

The comparator 123 compares the voltage to be monitored ($V_{DS}$_MM) with the determination voltage V to output the detection signal ERR that is a signal indicating the comparison result. After a predetermined time (td) after the gate-source voltage $V_{GS}$_MM exceeds the gate threshold voltage Vth, the delay circuit 121 and the selector 122 form a delay supply circuit that supplies the drain-source voltage $V_{DS}$_MM as a voltage to be monitored to the comparator 123. Note that the comparator 123 is connected to the terminal TS all the time and receives the source voltage $V_S$. Therefore, the supply of the drain voltage $V_D$ as the voltage $V_P$ to the comparator 123 is equivalent to the supply of the drain-source voltage $V_{DS}$_MM to the comparator 123.

When the target power transistor MM is ON, the comparator 123 compares the voltage to be monitored ($V_{DS}$_MM) with the determination voltage $V_J$ and determines in which one of the linear region and the saturation region the target power transistor MM operates. The comparator 123 may be configured to output the detection signal ERR in the asserted state when the comparator 123 determines that the target power transistor MM operates in the saturation region.

As described above, the drive circuits 100[1] to 100[8] have configurations common to each other (same configuration), and each of the drive circuits 100[1] to 100[8] functions as the target drive circuit 100A for the corresponding power transistor.

Although the SCC 1 functions as a buck SCC (voltage divider) in the configuration illustrated in the embodiment, the SCC 1 may function as a boost-side SCC (charge pump).

The relation between the high level and the low level of a freely selected signal or voltage may be opposite the relation described above as long as the objective is not lost.

The types of the channels of the FETs (field-effect transistors) illustrated in the embodiment are illustrative. The type of the channel of a freely selected FET may be changed between the P channel and the N channel as long as the objective is not lost. For example, the power transistors M1 to M8 may include P-channel MOSFETs.

A freely selected transistor described above may be a freely selected type of transistor as long as there is no inconvenience. For example, a freely selected transistor described above that is a MOSFET may be replaced with a junction FET, an IGBT (Insulated Gate Bipolar Transistor), or a bipolar transistor as long as there is no inconvenience. The freely selected transistor includes a first electrode, a second electrode, and a control electrode. In the FET, one of the first and second electrodes is the drain, and the other is the source. The control electrode is the gate. In the IGBT, one of the first and second electrodes is the collector, and the other is the emitter. The control electrode is the gate. In a bipolar transistor not belonging to the IGBT, one of the first and second electrodes is the collector, and the other is the emitter. The control electrode is the base.

In the example illustrated in the embodiment, the SCC includes eight switch elements (M1 to M8) and three flying capacitors (C1 to C3) connected in the connection relation of FIG. 1. However, as is well known, the number of switch elements, the number of flying capacitors, and the connection relation between the plurality of switch elements and the plurality of flying capacitors in the SCC may vary, and the technique of the present disclosure is not limited to the one described above. It is only sufficient that the switching circuit including the plurality of switch elements and the plurality of flying capacitors be connected to the input terminal that receives the input voltage ($V_{IN}$) and the output terminal that receives the output voltage ($V_{OUT}$) and the plurality of switch elements and the plurality of flying capacitors be connected to each other such that the output voltage ($V_{OUT}$) is generated from the input voltage ($V_{IN}$) by turning on and off the plurality of switch elements according to a predetermined pattern.

The embodiment of the present disclosure can be appropriately changed in various ways within the scope of the technical ideas illustrated in the claims. The embodiment described above is just an example of the embodiment of the present disclosure, and the meaning of the terms in the present disclosure and the constituent elements is not limited to the meaning described in the embodiment. The specific values illustrated in the description are illustrative only, and the values can be obviously changed to various values.

<<Supplement>>

The following is a supplement of the present disclosure for which the specific configuration example is illustrated in the embodiment.

A mode of the present disclosure provides a power supply semiconductor device (2) used in a switched capacitor converter (1) including a plurality of power transistors (M1 to M8) and a plurality of capacitors (C1 to C3), the switched capacitor converter configured to turn on and off the plurality of power transistors according to a predetermined pattern to generate an output voltage ($V_{OUT}$) from an input voltage ($V_{IN}$), the power supply semiconductor device including: a control block (10) configured to generate a control signal (CNT) for designating ON or OFF of each of the power transistors; and a drive block (20) connected to a gate of each of the power transistors and configured to drive the gate of each of the power transistors according to the control signal to turn on or off each of the power transistors, in which the drive block includes a target drive circuit (100A) corresponding to a target power transistor (MM) that is any one of the plurality of power transistors, the target drive circuit is connected to the gate of the target power transistor and configured to supply a gate signal (GG) to the target power transistor according to a target control signal (CNT_IN) that is the control signal for the target power transistor, the target drive circuit includes a detection circuit (120) configured to output a detection signal (ERR) corresponding to a drain-source voltage of the target power transistor after a gate-source voltage ($V_{GS}$_MM) of the target power transistor exceeds a gate threshold voltage of the target power transistor, and the target drive circuit generates the gate signal for the target power transistor according to the target control signal and the detection signal (first configuration).

When an excessive current flows through the target power transistor due to an output ground fault or other abnormalities, the drain-source voltage of the target power transistor is predicted to become abnormally large. As in the first configuration, the detection signal corresponding to the drain-source voltage of the target power transistor can be output, and the detection signal can also be taken into account to generate the gate signal. This can turn off and protect the target power transistor when an excessive current flows.

In the power supply semiconductor device according to the first configuration, the drive control signal may be in a first level or a second level, the target drive circuit may execute a basic turn-on operation of supplying a voltage exceeding the gate threshold voltage to between the gate and the source of the target power transistor to turn on the target power transistor in response to a change in the target control signal from the first level to the second level and may execute a basic turn-off operation of reducing the gate-source voltage of the target power transistor to below the gate threshold voltage to turn off the target power transistor in response to a change in the target control signal from the second level to the first level after the basic turn-on operation, the detection circuit in the target drive circuit may set the drain-source voltage of the target power transistor as a voltage to be monitored after the basic turn-on operation and may output the detection signal in an asserted state when the voltage to be monitored exceeds a predetermined determination voltage, and the target drive circuit may execute a protection operation of turning off the target power transistor regardless of the target control signal when the detection signal in the asserted state is output from the detection circuit after the basic turn-on operation (second configuration).

This can promptly turn off and protect the target power transistor if the drain-source voltage (voltage to be monitored) of the target power transistor becomes larger than the determination voltage when an excessive current caused by an output ground fault or other abnormalities flows through the target power transistor.

Although the first level and the second level correspond to the low level and the high level, respectively, in the example illustrated in FIGS. 19 to 22 and the like, the correspondence between them may be the opposite.

In the power supply semiconductor device according to the second configuration, the target drive circuit may maintain the target power transistor in the off-state until the first level changes to the second level in the target control signal after the target drive circuit turns off the target power transistor in the protection operation following the basic turn-on operation (third configuration).

This can prevent the excessive current from flowing through the target power transistor for a long time.

In the power supply semiconductor device according to the second configuration, the target drive circuit may maintain the target power transistor in the off-state until the first level changes to the second level in the target control signal after the target drive circuit turns off the target power transistor in the protection operation following the basic turn-on operation, and the target drive circuit may execute the basic turn-on operation again when the first level subsequently changes to the second level in the target control signal (fourth configuration).

In the power supply semiconductor device according to any one of the second to fourth configurations, the detection circuit may include: a comparator (123) configured to compare the voltage to be monitored with the determination voltage to output, as the detection signal, a signal indicating a comparison result; and a delay supply circuit (121, 122) configured to supply, as the voltage to be monitored, the drain-source voltage of the target power transistor to the comparator after a predetermined time after the gate-source voltage of the target power transistor exceeds the gate threshold voltage (fifth configuration).

As a result, the influence of ringing associated with switching of the target power transistor can be reduced in the detection circuit.

In the power supply semiconductor device according to the fifth configuration, the comparator may determine in which one of a linear region and a saturation region the target power transistor operates when the target power transistor is ON, and the comparator may output the detection signal in the asserted state when the comparator determines that the target power transistor operates in the saturation region (sixth region).

A detailed threshold voltage does not have to be set to determine in which one of the linear region and the saturation region the target power transistor operates, and the comparator can be a low-precision comparator capable of fast operation. This can sufficiently reduce the time of the excessive current flowing through the target power transistor when there is an output ground fault or other abnormalities. As a result, the damage to the elements (including the target power transistor) or the peripheral parts of the elements through which the excessive current flows can be kept to a manageable level.

In the power supply semiconductor device according to any one of the first to sixth configurations, a drive circuit may be provided for each of the power transistors on the drive block to thereby provide, on the drive block, a plurality of drive circuits (100[1] to 100[8]) corresponding to the plurality of power transistors, the plurality of drive circuits may have configurations common to each other, and each of the plurality of drive circuits may function as the target drive circuit for the corresponding power transistor (seventh configuration).

As a result, necessary protection can be performed for each power transistor.

The power supply semiconductor device according to any one of the first to seventh configurations may further include: an input terminal (PIN) configured to receive the input voltage; and an output terminal (OUT) configured to receive the output voltage, in which a switching circuit including the plurality of power transistors and the plurality of capacitors is connected to the input terminal and the output terminal, and the plurality of power transistors and the plurality of capacitors are connected to each other such that the output voltage is generated from the input voltage by turning on and off the plurality of power transistors according to the predetermined pattern (eighth configuration).

A mode of the present disclosure provides a switched capacitor converter including: the power supply semiconductor device according to any one of the first to eighth configurations including a plurality of power transistors; and a plurality of capacitors (ninth configuration).

The present disclosure can provide the power supply semiconductor device and the switched capacitor converter that can protect the parts (such as power transistors) in an abnormal state in which, for example, an excessive current is generated.

What is claimed is:

1. A power supply semiconductor device used in a switched capacitor converter including a plurality of power transistors and a plurality of capacitors, the switched capacitor converter configured to turn on and off the plurality of power transistors according to a predetermined pattern to generate an output voltage from an input voltage, the power supply semiconductor device comprising:

a control block configured to generate a control signal for designating ON or OFF of each of the plurality of power transistors; and a drive block connected to a gate of each of the plurality of power transistors and configured to drive the gate of each of the plurality of power transistors according to the control signal to turn on or off each of the plurality of power transistors, wherein the drive block includes a target drive circuit corresponding to a target power transistor that is any one of the plurality of power transistors, the target drive circuit is connected to the gate of the target power transistor and configured to supply a gate signal to the target power transistor according to a target control signal that is the control signal for the target power transistor, the target drive circuit includes a detection circuit configured to output a detection signal corresponding to a drain-source voltage of the target power transistor after a gate-source voltage saturates the target power transistor, and the target drive circuit generates the gate signal for the target power transistor according to the target control signal and the detection signal.

2. The power supply semiconductor device according to claim 1, wherein the control signal is in a first level or a second level, the target drive circuit is able to execute a basic turn-on operation of supplying a saturation voltage to the gate of the target power transistor to turn on the target power transistor in response to a change in the target control signal from the first level to the second level and is able to execute a basic turn-off operation of reducing the gate-source voltage below the saturation voltage to turn off the target power transistor in response to a change in the target control signal from the second level to the first level after the basic turn-on operation, the detection circuit in the target drive circuit sets the drain-source voltage of the target power transistor as a voltage to be monitored after the basic turn-on operation and outputs the detection signal in an asserted state when the voltage to be monitored exceeds a predetermined determination voltage, and the target drive circuit executes a protection operation of turning off the target power transistor regardless of the target control signal when the detection signal in the asserted state is output from the detection circuit after the basic turn-on operation.

3. The power supply semiconductor device according to claim 2, wherein the target drive circuit maintains the target power transistor in an off-state until the first level changes to the second level in the target control signal after the target drive circuit turns off the target power transistor in the protection operation following the basic turn-on operation.

4. The power supply semiconductor device according to claim 2, wherein the target drive circuit maintains the target power transistor in an off-state until the first level changes to the second level in the target control signal after the target drive circuit turns off the target power transistor in the protection operation following the basic turn-on operation, and the target drive circuit executes the basic turn-on operation again when the first level subsequentially changes to the second level in the target control signal.

5. The power supply semiconductor device according to claim 2, wherein the detection circuit includes a comparator configured to compare the voltage to be monitored with the predetermined determination voltage to output, as the detection signal, a signal indicating a comparison result, and a delay supply circuit configured to supply, as the voltage to be monitored, the drain-source voltage of the target power transistor to the comparator after a predetermined time after the gate-source voltage of the target power transistor exceeds a gate threshold voltage.

6. The power supply semiconductor device according to claim 5, wherein the comparator determines in which one of a linear region and a saturation region the target power transistor operates when the target power transistor is ON, and the comparator outputs the detection signal in the asserted state when the comparator determines that the target power transistor operates in the saturation region.

7. The power supply semiconductor device according to claim 1, wherein a drive circuit is provided for each of the plurality of power transistors on the drive block to thereby provide, on the drive block, a plurality of drive circuits corresponding to the plurality of power transistors, the plurality of drive circuits have configurations common to each other, and each of the plurality of drive circuits functions as the target drive circuit for corresponding power transistor of the plurality of power transistors.

8. The power supply semiconductor device according to claim 1, further comprising:

an input terminal configured to receive the input voltage; and an output terminal configured to receive the output voltage, wherein a switching circuit including the plurality of power transistors and the plurality of capacitors is connected to the input terminal and the output terminal, and the plurality of power transistors and the plurality of capacitors are connected to each other such that the output voltage is generated from the input voltage by turning on and off the plurality of power transistors according to the predetermined pattern.

9. A switched capacitor converter comprising:

the power supply semiconductor device according to claim 1 including the plurality of power transistors; and the plurality of capacitors.

* * * * *